US010049150B2

(12) United States Patent
Liang et al.

(10) Patent No.: US 10,049,150 B2
(45) Date of Patent: Aug. 14, 2018

(54) CATEGORY-BASED CONTENT RECOMMENDATION

(71) Applicant: FIVER LLC, Wilmington, DE (US)

(72) Inventors: Jisheng Liang, Bellevue, WA (US); Krzysztof Koperski, Seattle, WA (US); Jennifer Cooper, Seattle, WA (US); Theodore Diamond, Seattle, WA (US)

(73) Assignee: FIVER LLC, Wilmington, DE (US)

( * ) Notice: Subject to any disclaimer, the term of this patent is extended or adjusted under 35 U.S.C. 154(b) by 554 days.

(21) Appl. No.: 14/231,238

(22) Filed: Mar. 31, 2014

(65) Prior Publication Data

US 2014/0214850 A1    Jul. 31, 2014

Related U.S. Application Data

(63) Continuation of application No. 13/286,778, filed on Nov. 1, 2011, now Pat. No. 8,725,739.

(Continued)

(51) Int. Cl.
*G06F 17/30*    (2006.01)

(52) U.S. Cl.
CPC .... *G06F 17/30643* (2013.01); *G06F 17/3053* (2013.01); *G06F 17/30696* (2013.01);
(Continued)

(58) Field of Classification Search
CPC ......... G06F 17/30643; G06F 17/30873; G06F 17/28; G06F 17/30011; G06F 17/30598;
(Continued)

(56) References Cited

U.S. PATENT DOCUMENTS

| 4,839,853 A | 6/1989 | Deerwester et al. ......... 364/900 |
| 4,887,212 A | 12/1989 | Zamora et al. |

(Continued)

FOREIGN PATENT DOCUMENTS

| EP | 0 280 866 | 9/1988 |
| EP | 0 585 079 | 3/1994 |

(Continued)

OTHER PUBLICATIONS

Abraham, "FoXQ—Xquery by Forms," Human Centric Computing Languages and Environments, IEEE Symposium, Oct. 28-31, 2003, Piscataway, New Jersey, pp. 289-290.

(Continued)

*Primary Examiner* — Srirama Channavajjala
(74) *Attorney, Agent, or Firm* — Perkins Coie LLP

(57) ABSTRACT

Techniques for category-based content recommendation are described. Some embodiments provide a content recommendation system ("CRS") configured to recommend content items (e.g., Web pages, images, videos) that are related to specified categories. In one embodiment, the CRS processes content items to determine entities referenced by the content items, and to determine categories related to the referenced entities. The determined entities and/or categories may be part of a taxonomy that is stored by the CRS. Then, in response to a received request that indicates a category, the CRS determines and provides indications of one or more content items that each have a corresponding category that matches the indicated category. In some embodiments, at least some of these techniques are employed to implement a category-based news service.

4 Claims, 12 Drawing Sheets

Related U.S. Application Data

(60) Provisional application No. 61/408,965, filed on Nov. 1, 2010.

(52) U.S. Cl.
CPC .. *G06F 17/30705* (2013.01); *G06F 17/30734* (2013.01); *G06F 17/30873* (2013.01)

(58) Field of Classification Search
CPC .............. G06F 17/30; G06F 17/30734; G06F 17/3053; G06F 17/30696; G06F 17/30705
See application file for complete search history.

(56) References Cited

U.S. PATENT DOCUMENTS

| | | | |
|---|---|---|---|
| 5,301,109 A | 4/1994 | Landauer et al. | 364/419.19 |
| 5,317,507 A | 5/1994 | Gallant | 364/419.13 |
| 5,325,298 A | 6/1994 | Gallant | 364/419.19 |
| 5,331,556 A | 7/1994 | Black, Jr. et al. | 364/419.08 |
| 5,377,103 A | 12/1994 | Lamberti et al. | 364/419.08 |
| 5,590,322 A | 12/1996 | Harding et al. | |
| 5,619,709 A | 4/1997 | Caid et al. | 395/794 |
| 5,634,051 A | 5/1997 | Thomson | 395/605 |
| 5,752,022 A | 5/1998 | Chiu et al. | |
| 5,778,362 A | 7/1998 | Deerwester | 707/5 |
| 5,794,050 A | 8/1998 | Dahlgren et al. | 395/708 |
| 5,794,178 A | 8/1998 | Caid et al. | 704/9 |
| 5,799,268 A | 8/1998 | Boguraev | 704/9 |
| 5,848,417 A | 12/1998 | Shoji et al. | 707/102 |
| 5,857,179 A | 1/1999 | Vaithyanathan et al. | 707/2 |
| 5,884,302 A | 3/1999 | Ho | 707/3 |
| 5,933,822 A | 8/1999 | Braden Harder et al. | 707/5 |
| 5,950,189 A | 9/1999 | Cohen et al. | 707/3 |
| 5,982,370 A | 11/1999 | Kamper | 345/356 |
| 6,006,221 A | 12/1999 | Liddy et al. | 707/5 |
| 6,006,225 A | 12/1999 | Bowman et al. | 707/5 |
| 6,026,388 A | 2/2000 | Liddy et al. | 707/1 |
| 6,061,675 A | 5/2000 | Wical | 706/45 |
| 6,064,951 A | 5/2000 | Park et al. | 704/8 |
| 6,122,647 A | 9/2000 | Horowitz et al. | 707/513 |
| 6,167,368 A | 12/2000 | Wacholder | 704/9 |
| 6,178,416 B1 | 1/2001 | Thompson et al. | 707/3 |
| 6,185,550 B1 | 2/2001 | Snow et al. | 707/1 |
| 6,192,360 B1 | 2/2001 | Dumais et al. | 707/6 |
| 6,202,064 B1 | 3/2001 | Julliard | 707/5 |
| 6,219,664 B1 | 4/2001 | Watanabe | 707/3 |
| 6,246,977 B1 | 6/2001 | Messerly et al. | 704/9 |
| 6,311,152 B1 | 10/2001 | Bai et al. | 704/9 |
| 6,363,373 B1 | 3/2002 | Steinkraus | 707/3 |
| 6,405,190 B1 | 6/2002 | Conklin | 707/3 |
| 6,411,962 B1 | 6/2002 | Kupiec | 707/102 |
| 6,460,029 B1 | 10/2002 | Fries et al. | 707/3 |
| 6,484,162 B1 | 11/2002 | Edlund et al. | 707/3 |
| 6,510,406 B1 | 1/2003 | Marchisio | 704/9 |
| 6,571,236 B1 | 5/2003 | Ruppelt | 707/3 |
| 6,584,464 B1 | 6/2003 | Warthen | 707/4 |
| 6,601,026 B2 | 7/2003 | Appelt et al. | 704/9 |
| 6,728,707 B1 | 4/2004 | Wakefield et al. | 707/5 |
| 6,732,097 B1 | 5/2004 | Wakefield et al. | 707/5 |
| 6,732,098 B1 | 5/2004 | Wakefield et al. | 707/5 |
| 6,738,765 B1 | 5/2004 | Wakefield et al. | 707/5 |
| 6,741,988 B1 | 5/2004 | Wakefield et al. | 707/7 |
| 6,745,161 B1 | 6/2004 | Arnold et al. | 704/7 |
| 6,757,646 B2 | 6/2004 | Marchisio | 704/8 |
| 6,859,800 B1 | 2/2005 | Roche et al. | 707/3 |
| 6,862,710 B1 | 3/2005 | Marchisio | 715/501.1 |
| 6,904,433 B2 | 6/2005 | Kapitskaia et al. | 707/10 |
| 6,910,003 B1 | 6/2005 | Arnold et al. | 704/4 |
| 6,996,575 B2 | 2/2006 | Cox et al. | 707/102 |
| 7,051,017 B2 | 5/2006 | Marchisio | 707/3 |
| 7,054,854 B1 | 5/2006 | Hattori et al. | 707/3 |
| 7,171,349 B1 | 1/2007 | Wakefield et al. | 704/9 |
| 7,283,951 B2 | 10/2007 | Marchisio et al. | 704/9 |
| 7,398,201 B2* | 7/2008 | Marchisio | G06F 17/271 704/9 |
| 7,403,938 B2 | 7/2008 | Harrison et al. | 707/3 |
| 7,451,135 B2 | 11/2008 | Goldman et al. | 707/3 |
| 7,526,425 B2 | 4/2009 | Marchisio et al. | 704/9 |
| 7,529,756 B1 | 5/2009 | Haschart et al. | |
| 7,672,833 B2 | 3/2010 | Blume et al. | 704/10 |
| 7,752,200 B2 | 7/2010 | Scholl et al. | 707/730 |
| 7,788,084 B2 | 8/2010 | Brun et al. | 704/7 |
| 8,112,402 B2 | 2/2012 | Cucerzan et al. | 707/705 |
| 8,122,016 B1 | 2/2012 | Lamba et al. | 707/723 |
| 8,122,026 B1 | 2/2012 | Laroco, Jr. et al. | 707/737 |
| 8,594,996 B2 | 11/2013 | Liang et al. | |
| 8,666,909 B2 | 3/2014 | Pinckney et al. | 706/11 |
| 8,700,604 B2 | 4/2014 | Roseman et al. | |
| 8,725,739 B2* | 5/2014 | Liang | G06F 17/30873 707/740 |
| 8,856,096 B2 | 10/2014 | Marchisio et al. | |
| 8,954,469 B2 | 2/2015 | Dhillon et al. | |
| 2002/0007267 A1 | 1/2002 | Batchilo et al. | 704/9 |
| 2002/0010574 A1 | 1/2002 | Tsourikov et al. | 704/9 |
| 2002/0022956 A1 | 2/2002 | Ukrainczyk et al. | 704/9 |
| 2002/0059161 A1 | 5/2002 | Li | 707/1 |
| 2002/0078041 A1 | 6/2002 | Wu | 707/4 |
| 2002/0078045 A1 | 6/2002 | Dutta | 707/7 |
| 2002/0091671 A1 | 6/2002 | Prokoph | 707/1 |
| 2002/0103789 A1 | 8/2002 | Turnbull et al. | 707/3 |
| 2002/0120651 A1 | 8/2002 | Pustejovsky et al. | 707/513 |
| 2003/0004716 A1 | 1/2003 | Haigh et al. | 704/238 |
| 2003/0101182 A1 | 5/2003 | Gorvin et al. | 707/7 |
| 2003/0115065 A1 | 6/2003 | Kakivaya et al. | 704/270.1 |
| 2003/0115191 A1 | 6/2003 | Copperman et al. | 707/3 |
| 2003/0191626 A1 | 10/2003 | Al-Onzian et al. | 704/8 |
| 2003/0233224 A1 | 12/2003 | Marchisio et al. | 704/4 |
| 2004/0010508 A1 | 1/2004 | Fest et al. | 707/102 |
| 2004/0064447 A1 | 4/2004 | Simske et al. | 707/5 |
| 2004/0103090 A1 | 5/2004 | Dogl et al. | 707/3 |
| 2004/0125877 A1 | 7/2004 | Chang et al. | 375/240.28 |
| 2004/0167870 A1 | 8/2004 | Wakefield et al. | 707/1 |
| 2004/0167883 A1 | 8/2004 | Wakefield et al. | 707/3 |
| 2004/0167884 A1 | 8/2004 | Wakefield et al. | 707/3 |
| 2004/0167885 A1 | 8/2004 | Wakefield et al. | 707/3 |
| 2004/0167886 A1 | 8/2004 | Wakefield et al. | 707/3 |
| 2004/0167887 A1 | 8/2004 | Wakefield et al. | 707/3 |
| 2004/0167907 A1 | 8/2004 | Wakefield et al. | 707/100 |
| 2004/0167908 A1 | 8/2004 | Wakefield et al. | 707/100 |
| 2004/0167909 A1 | 8/2004 | Wakefield et al. | 707/100 |
| 2004/0167910 A1 | 8/2004 | Wakefield et al. | 707/100 |
| 2004/0167911 A1 | 8/2004 | Wakefield et al. | 707/100 |
| 2004/0205448 A1 | 10/2004 | Grefenstette et al. | |
| 2004/0221235 A1 | 11/2004 | Marchisio et al. | 715/534 |
| 2004/0243388 A1 | 12/2004 | Corman et al. | 704/1 |
| 2005/0027704 A1 | 2/2005 | Hammond et al. | 707/5 |
| 2005/0049852 A1 | 3/2005 | Chao | |
| 2005/0076365 A1 | 4/2005 | Popov et al. | 725/46 |
| 2005/0080613 A1 | 4/2005 | Colledge et al. | |
| 2005/0108001 A1 | 5/2005 | Aarskog | 704/10 |
| 2005/0108262 A1 | 5/2005 | Fawcett, Jr. et al. | 707/100 |
| 2005/0138018 A1 | 6/2005 | Sakai et al. | 707/3 |
| 2005/0149473 A1 | 7/2005 | Weare | |
| 2005/0149494 A1 | 7/2005 | Lindh et al. | 707/3 |
| 2005/0177805 A1 | 8/2005 | Lynch et al. | 715/968 |
| 2005/0197828 A1 | 9/2005 | McConnell et al. | 704/9 |
| 2005/0210000 A1 | 9/2005 | Michard | 707/3 |
| 2005/0216443 A1 | 9/2005 | Morton et al. | 707/3 |
| 2005/0234879 A1 | 10/2005 | Zeng et al. | 707/3 |
| 2005/0234968 A1 | 10/2005 | Arumainayagam et al. | |
| 2005/0262050 A1 | 11/2005 | Fagin et al. | |
| 2005/0267871 A1 | 12/2005 | Marchisio et al. | 707/3 |
| 2006/0149734 A1 | 7/2006 | Egnor et al. | 707/7 |
| 2006/0167862 A1 | 7/2006 | Reisman | |
| 2006/0224565 A1 | 10/2006 | Ashutosh et al. | 707/3 |
| 2006/0229889 A1 | 10/2006 | Hodjat et al. | |
| 2006/0271353 A1 | 11/2006 | Berkan et al. | |
| 2006/0279799 A1 | 12/2006 | Goldman | 358/403 |
| 2006/0287971 A1 | 12/2006 | Armstrong | |
| 2007/0067285 A1 | 3/2007 | Blume et al. | 707/5 |
| 2007/0130194 A1 | 6/2007 | Kaiser | 707/102 |
| 2007/0136326 A1 | 6/2007 | McClement et al. | 707/100 |
| 2007/0143300 A1 | 6/2007 | Gulli et al. | 707/10 |
| 2007/0209013 A1 | 9/2007 | Ramsey et al. | 715/769 |

(56) References Cited

U.S. PATENT DOCUMENTS

| | | | |
|---|---|---|---|
| 2007/0233656 A1 | 10/2007 | Bunescu et al. | 707/3 |
| 2007/0276830 A1 | 11/2007 | Gruhl et al. | |
| 2008/0005651 A1 | 1/2008 | Grefenstette et al. | 715/500 |
| 2008/0010270 A1 | 1/2008 | Gross | 707/5 |
| 2008/0059456 A1 | 3/2008 | Chowdhury et al. | 707/5 |
| 2008/0082578 A1 | 4/2008 | Hogue et al. | 707/104.1 |
| 2008/0097975 A1 | 4/2008 | Guay et al. | 707/4 |
| 2008/0097985 A1 | 4/2008 | Olstad et al. | 707/5 |
| 2008/0120129 A1 | 5/2008 | Seubert et al. | |
| 2008/0127331 A1 | 5/2008 | Seidman et al. | |
| 2008/0208864 A1 | 8/2008 | Cucerzan et al. | 707/8 |
| 2008/0222105 A1 | 9/2008 | Matheny | |
| 2008/0228720 A1 | 9/2008 | Mukherjee et al. | 707/3 |
| 2008/0235203 A1 | 9/2008 | Case et al. | 707/5 |
| 2008/0249991 A1 | 10/2008 | Valz | |
| 2008/0303689 A1 | 12/2008 | Iverson | 340/825.36 |
| 2009/0070325 A1 | 3/2009 | Gabriel et al. | |
| 2009/0144609 A1 | 6/2009 | Liang et al. | 715/230 |
| 2009/0187467 A1 | 7/2009 | Fang et al. | 705/10 |
| 2009/0228439 A1 | 9/2009 | Manolescu et al. | 707/3 |
| 2009/0248678 A1 | 10/2009 | Okamoto | 707/5 |
| 2009/0327223 A1 | 12/2009 | Chakrabarti et al. | |
| 2010/0010994 A1 | 1/2010 | Wittig et al. | 707/6 |
| 2010/0046842 A1 | 2/2010 | Conwell | 382/218 |
| 2010/0048242 A1 | 2/2010 | Rhoads et al. | 455/556.1 |
| 2010/0145940 A1 | 6/2010 | Chen et al. | 707/736 |
| 2010/0250497 A1 | 9/2010 | Redlich et al. | 707/661 |
| 2010/0299326 A1 | 11/2010 | Germaise | 707/728 |
| 2010/0306251 A1 | 12/2010 | Snell | 707/769 |
| 2011/0112995 A1 | 5/2011 | Chang et al. | 706/12 |
| 2011/0208801 A1 | 8/2011 | Thorkelsson et al. | |
| 2012/0254188 A1 | 10/2012 | Koperski et al. | 707/740 |
| 2013/0124510 A1 | 5/2013 | Guha | 707/723 |

FOREIGN PATENT DOCUMENTS

| | | |
|---|---|---|
| EP | 0 597 630 | 5/1994 |
| WO | 00/14651 | 3/2000 |
| WO | 00/57302 | 9/2000 |
| WO | 01/22280 | 3/2001 |
| WO | 01/80177 | 10/2001 |
| WO | 02/27536 | 4/2002 |
| WO | 02/33583 | 4/2002 |
| WO | 2004/053645 | 6/2004 |
| WO | 07/113546 | 10/2007 |

OTHER PUBLICATIONS

Cass, "A Fountain of Knowledge," IEEE Spectrum Online, URL: http://www.spectrum.ieee.org/WEBONLY/publicfeature/jan04/0104comp1.html, download date Feb. 4, 2004, 8 pages.

Feldman et al., "Text Mining at the Term Level," Proc. of the 2nd European Symposium on Principles of Data Mining and Knoweldge Discovery, Nantes, France, 1998, pp. 1-9.

Ilyas et al., "A Conceptual Architecture for Semantic Search Engine," IEEE, INMIC, 2004, pp. 605-610.

Jayapandian et al., "Automating the Design and Construction of Query Forms," Data Engineering, Proceedings of the 22nd International Conference IEEE, Atlanta, Georgia, Apr. 3, 2006, pp. 125-127.

Kaiser, "Ginseng—A Natural Language User Interface for Semantic Web Search," University of Zurich, Sep. 16, 2004, URL=http://www.ifi.unizh.ch/archive/mastertheses/DA_Arbeiten_2004/Kaiser_Christian.pdf, pp. 1-84.

Liang et al., "Extracting Statistical Data Frames from Text," SIGKDD Explorations 7(1):67-75, Jun. 2005.

Littman et al., "Automatic Cross-Language Information Retrieval Using Latent Semantic Indexing," In Grefenstette, G. editor, Cross Language Information Retrieval. Kluwer, 1998, pp. 1-11.

Nagao et al., "Semantic Annotation and Transcoding: Making Web Content More Accessible," *IEEE Multimedia, IEEE Computer Society*, US, 8(2):69-81, Apr. 2001.

Nguyen et al., "Accessing Relational Databases from the World Wide Web," SIGMOD Record ACM USA, Jun. 1996, vol. 25, No. 2, pp. 529-540.

Pohlmann et al., "The Effect of Syntactic Phrase Indexing on Retrieval Performance for Dutch Texts," *Proceedings of RIAO*, pp. 176-187, Jun. 1997.

Rasmussen, "WDB—A Web Interface to Sybase," Astronomical Society of the Pacific Conference Series, Astron. Soc. Pacific USA, 1995, vol. 77, pp. 72-75, 1995.

Sneiders, "Automated Question Answering Using Question Templates That Cover the Conceptual Model of the Database," *Natural Language Processing and Information Systems, 6th International Conference on Applications of Natural Language to Information Systems*, Revised Papers (Lecture Notes in Computer Science vol. 2553) Springer-Verlag Berlin, Germany, 2002 vol. 2553, pp. 235-239.

Ruiz-Casado et al., "From Wikipedia to Semantic Relationships: a Semi-Automated Annotation Approach" 2006, pp. 1-14.

Florian et al., "Named Entity Recognition through Classifier Combination", 2003, IBM T.J. Watson Research Center, pp. 168-171.

Wu et al., "A Stacked, Voted, Stacked Model for Named Entity Recognition", 2003, pp. 1-4.

Google "How to Interpret your Search Results", http://web.archive.org/web/2011116075703/http://www.google.com/intl/en/help/interpret/htht, Mar. 27, 2001, 6 pages.

Razvan Bunescu et al., "Using Encyclopedia Knowledge for Named Entity Disambiguation" 2006, Google, pp. 9-16.

Silviu Cucerzan, "Large-Scale Named Entity Disambiguation Based on Wikipedia Data", *Proceedings of the 2007 Joint Conference on Empirical Methods in Natural Language Processing and Computational Natural Language Learning*, Prague, Jun. 2007, pp. 708-716.

Bunescu "Learning for Information Extraction: From Named Entity Recognition and Disambiguation to Relation Extraction", *The Dissertation Committee for Aug. 2007*, The University of Texas at Austin, pp. 1-150.

Hassell et al., "Ontology-Driven Automatic Entity Disambiguation in Unstructured Text", *Large Scale Distributed Information Systems (LSDIS) Lab Computer Science Department*, University of Georgia, Athens, GA 30602-7404, ISWC, 2006, LNCS 4273, pp. 44-57.

Lloyd et al.,"Disambiguation of References to Individuals", IBM Research Report, Oct. 28, 2005, pp. 1-9.

William H. Press et al.: "Backus-Gilbert Method, Chapter 18.6" In: "Fortran Numerical Recipes Second Edition", Jan. 1, 1996, Cambridge University Press, XP055083119, pp. 806-809.

DARPA-61 Phase I Selections from the 99.1 Solicitation, Jul. 1, 1999, p. 21 of 30, entitled "An Inverse Inference Engine for High Precision Web Search" by Marchisio, topic# DARPA 99-020.

Volz, Raphael et al., "Towards ontology-based disambiguation of geographical identifiers," Jan. 1, 2007, XP055003726, 7 pages.

\* cited by examiner

```
<entity id="302131" href="/person/martell-webster-0x49c33">
  <facets>
    <facet lookupName="basketball_player">
      <name>Basketball Player</name>
      <taxonomicPaths>
        <taxonomicPath>Evri/Person/Sports/Athlete/Basketball_Player</taxonomicPath>
      </taxonomicPaths>
    </facet>
  </facets>
  <name>Martell Webster</name>
  <properties>
    <property displayName="Birth Date">
      <name>birth_date</name>
      <value>December 4, 1986</value>
    </property>
    <property displayName="League">
      <name>sports_league</name>
      <value>NBA</value>
    </property>
    ...
  </properties>
  <type>PERSON</type>
</entity>
```

*Fig. 4A*

```xml
<entity id="302110" href="/organization/portland-trail-blazers-0x498a4">
  <facets>
    <facet lookupName="basketball_team" count="79804">
      <name>Basketball Team</name>
      <taxonomicPaths>
        <taxonomicPath>Evri/Organization/Sports/Basketball_Team</taxonomicPath>
      </taxonomicPaths>
    </facet>
  </facets>
  <name>Portland Trail Blazers</name>
  <properties>
    <property displayName="League">
      <name>sports_league</name>
      <value>NBA</value>
    </property>
    <property displayName="Championships">
      <name>number_championship</name>
      <value>1 (1977)</value>
    </property>
    ...
  </properties>
  <type>ORGANIZATION</type>
</entity>
```

Blazers hold off Lakers improve playoff position

LOS ANGELES (AP) — Martell Webster's flawless free-throw stroke was just about the only thing that worked the way it's supposed to in a significant win for the Portland Trail Blazers hopes of avoiding a return to Staples Center next week.

Yet given the way these Blazers have been playing for nearly two months, they're bound to be big trouble for anybody in the postseason — even if it turns out to be the Los Angeles Lakers anyway.

CATEGORY-BASED CONTENT RECOMMENDATION

CROSS REFERENCE TO RELATED APPLICATIONS

This application is a continuation of U.S. application Ser. No. 13/286,778, (now U.S. Pat. No. 8,725,739) entitled "CATEGORY-BASED CONTENT RECOMMENDATION," filed Nov. 1, 2011, which claims the benefit of U.S. Provisional Application No. 61/408,965, entitled, "CATEGORY-BASED CONTENT RECOMMENDATION," filed Nov. 1, 2010, all of which are incorporated herein by reference in their entireties.

TECHNICAL FIELD

The present disclosure relates to methods, techniques, and systems for category-based content recommendation and, more particularly, to methods, techniques, and systems for recommending content items, such as news stories, that reference entities in an indicated category.

BACKGROUND

Various approaches for automated categorization (or classification) of texts into predefined categories exist. One approach to this problem uses machine learning: a general inductive process automatically builds a classifier by learning, from a set of pre-classified documents that are represented as vectors of key terms, the characteristics of the categories. Various machine-learning techniques may be employed. In one approach, for each category, a set of human-labeled examples are collected as training data in order to build classifiers, such as Decision Tree classifiers, Naive Bayes classifiers, Support Vector Machines, Neural Networks, or the like. A separate classifier typically must be built for each new category. Such approaches also may not scale well when processing a large quantity of documents. For example, to add a new category, a new classifier may need to be built. Then, every document may need to be run through the resulting classifier.

In addition, various approaches to providing computer-generated news Web sites exist. One approach aggregates headlines from news sources worldwide, and groups similar stories together. The stories are grouped into a handful of broad, statically defined categories, such as Business, Sports, Entertainment, and the like. In some approaches, the presentation of news items may be customized, such as by allowing users to specify keywords to filter news items. However, such a keyword-based approach to customization may be limited because it can be difficult or impossible to express higher-order concepts with simple keywords. For example, if a user wishes to obtain articles about NBA basketball players, the term "NBA" may yield an over-inclusive result set, by including many articles that do not mention any basketball players. On the other hand, the terms "NBA basketball player" may yield an under-inclusive result set, by not including articles that do not include the specified keywords but that do mention some NBA basketball player by name.

BRIEF DESCRIPTION OF THE DRAWINGS

FIGS. 4A-4D illustrate example data processed and/or utilized by an example embodiment.

DETAILED DESCRIPTION

Figure 1:
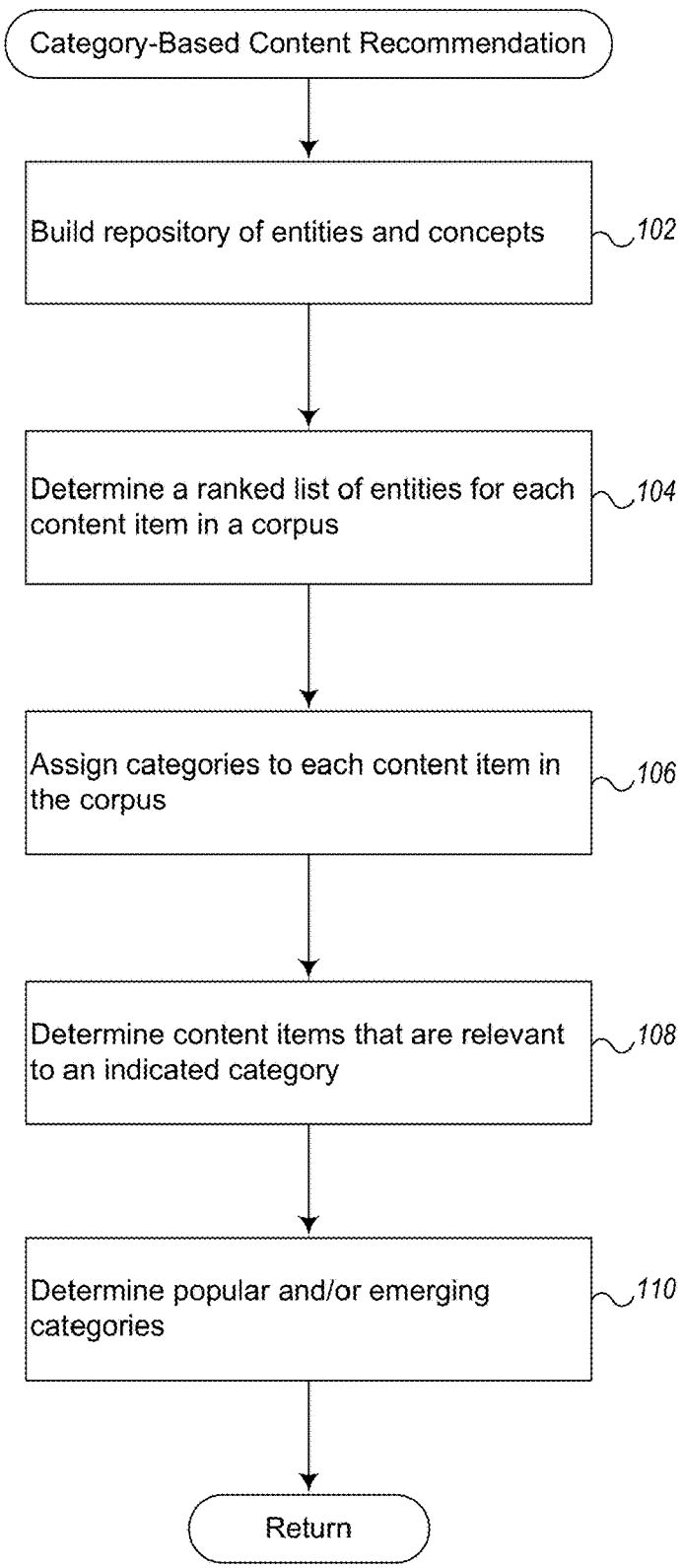
FIG. 1 is an example flow diagram of a category-based content recommendation process performed by an example embodiment.

Embodiments described herein provide enhanced computer- and network-based methods and systems for recommending content and more particularly, recommending content items in specified categories. Example embodiments provide a content recommendation system ("CRS") configured to recommend content items such as articles, documents, videos, advertisements, product information, software applications/modules, and the like. Recommending content items may include determining content items that are in an indicated category, based on whether entities referenced by those content items are in or otherwise related to the indicated category. In some embodiments, the content items are news items that include timely information about recent or important events. Example news items may be documents that include news stories or reports, press releases, video news reporting, radio news broadcasts, or the like.

In some embodiments, the CRS indexes a corpus of content items by determining semantic information about the content items. Determining semantic information may include determining entities that are referenced by the content items. A content item may reference an entity by naming or describing the entity. Entities may include people, places (e.g., locations), organizations (e.g., political parties, corporations, groups), events, concepts, products, substances, and the like. For example, the sentence "Sean Connery starred as James Bond," names the entities Sean Connery and James Bond. Table 1, below, includes a list of example entity types. Fewer or more entity types may be available.

Determining semantic information may further include determining categories that are associated with the determined entities. In some embodiments, entities may further be associated with (e.g., related to) one or more categories (also called "facets"). Example facets include actor, politician, athlete, nation, drug, sport, automobile, and the like. The entities and/or categories may be arranged in a semantic network, such as a taxonomic graph that includes relations between various categories and/or entities. In one embodiment, each entity is associated with at least one category, via an is-a relationship (e.g., Sean Connery is-a Actor), and each category may be associated with one or more other categories (e.g., an Actor is-a Person). The CRS may exploit the relationships or links in the semantic network to determine and store relevant categories associated with a particular content item. Table 2, below, includes a list of example categories/facets. Fewer, greater, or different categories may be incorporated or utilized.

In some embodiments, the CRS provides a search and discovery facility that is configured to recommend content items that include or otherwise are related to one or more specified categories. In one embodiment, the CRS receives an indication of a category, such as via a Web-based search interface. In response, the CRS determines (e.g., finds, selects, obtains, identifies) one or more content items that reference or are otherwise related to the specified category. The CRS may then rank or order the selected content items, such that more relevant content items appear before less relevant content items. The CRS then provides indications of the selected content items, such as by storing, transmitting, or forwarding the selected content items.

1. Overview of Category-Based Content Recommendation in One Embodiment

FIG. 1 is an example flow diagram of a category-based content recommendation process performed by an example embodiment. In particular, FIG. 1 illustrates a process that may be implemented by and/or performed by an example content recommendation system. The process automatically provides content items relevant to a specified topic category.

The process begins at block 102, where it builds a repository of entities and concepts. In one embodiment, building the repository may include automatically identifying entities by processing structured or semi-structured data, such as may be obtained Wikipedia, Techcrunch, or other public or private data repositories, knowledge bases, news feeds, and the like. In other embodiments, unstructured text documents or other content items (e.g., audio data) may be processed to identify entities. As noted above, entities may be organized into taxonomic hierarchies, based on taxonomic relations such as is-a, part-of, member-of, and the like. In some embodiments, the entities are also associated with properties. Taxonomic paths and/or properties may be extracted from structured and semi-structured sources (e.g., Wikipedia). An example taxonomic hierarchy is illustrated with respect to FIG. 4D.

At block 104, the process determines a ranked list of entities for each content item in a corpus of content items. In some embodiments, the process uses entity tagging and disambiguation to link references to entities that occur in the text of a content item to entries in the repository of entities and concepts generated at block 102. Then, for each content item, the process determines a ranked list of entities, ordered by their importance and relevance to the main subject/topic of the content item.

At block 106, the process assigns categories to each content item in the corpus of content items, based on the ranked list of entities determined at block 104. The categories may be or include any node or path in a semantic network and/or a taxonomic graph, or any properties that may be shared by a group of entities (e.g., Pac-10 conference teams, University of Washington Huskies football players, left-handed baseball pitchers, rookie football quarterbacks). The assigned categories may be based on groups of entities or entity types, grouped based on their taxonomic paths and/or any selected properties. Assigning categories to a content item may further include storing the determined categories in an inverted index or other type of data structure for efficient retrieval at a later time. In other embodiments, the process assigns categories to only some of the content items in the corpus, leaving content items without an assigned category. This may occur for various reasons, such as because no category can be determined, for performance reasons (e.g., only recent content items are processed), or the like.

At block 108, the process determines content items that are relevant to an indicated category. In one embodiment, the CRS provides a search engine facility that can answer queries requesting content items related to one or more specified categories. Thus, determining relevant content items may include finding content items that match or are otherwise related to at least one of the specified categories. The determined content items may be ranked by factors such as source credibility, popularity of the topic, recency, or the like. The determined content items may then be provided (e.g., transmitted, sent, forwarded, stored), such as in response to a received search query or other request.

Additional related information may also or instead be determined that this time, including producing a summarization of the specified category by producing a list of current and popular entities in the specified category. For example, given the category "NCAA basketball", the process may determine and return teams and players that are most popular in the news recently. Such additional information may then also be provided in response to a received search query or other request.

At block 110, the process determines popular and/or emerging categories. In one embodiment, the CRS is configured to provide a feed, stream, or other dynamic collection, such as may be part of an automated news service, where news items are organized by popular and/or emerging categories. Popular and/or emerging categories may be automatically determined based on popularity ranking and detection of emerging categories, by aggregating popularity measures of entities and documents that belong to each category. The source of entity popularity measures may be page views, user clicks, recent (e.g., last day/week) mentions in content items, Wikipedia traffic, Twitter references, and the like.

In addition, the CRS may also determine popular and emerging entities within a category. For example, for a category such as NBA Basketball, the CRS may determine entities (e.g., players, teams, coaches) that have recently received significant press coverage, such as NBA basketball teams (and their players) that are playing each other in a current championship series or other event that has recently (e.g., within the last day, week, month) received additional press coverage.

The CRS may identify, organize, and/or present content items in other or additional ways. For example, within a given category, the CRS may identify content items that reference or are related to particular events. For example, in a sports category, the CRS may automatically identify, group, and/or present content items about various sports-related events, such as injuries within particular sports (e.g., injuries suffered by football players), awards (e.g., player of the year), player-team engagements (e.g., contract renewals), or the like. Or, in an entertainment category, the CRS may automatically identify content items about common gossip events, such as romances, break-ups, movie openings, or the like.

2. Functional Elements of an Example Content Recommendation System

Figure 2:
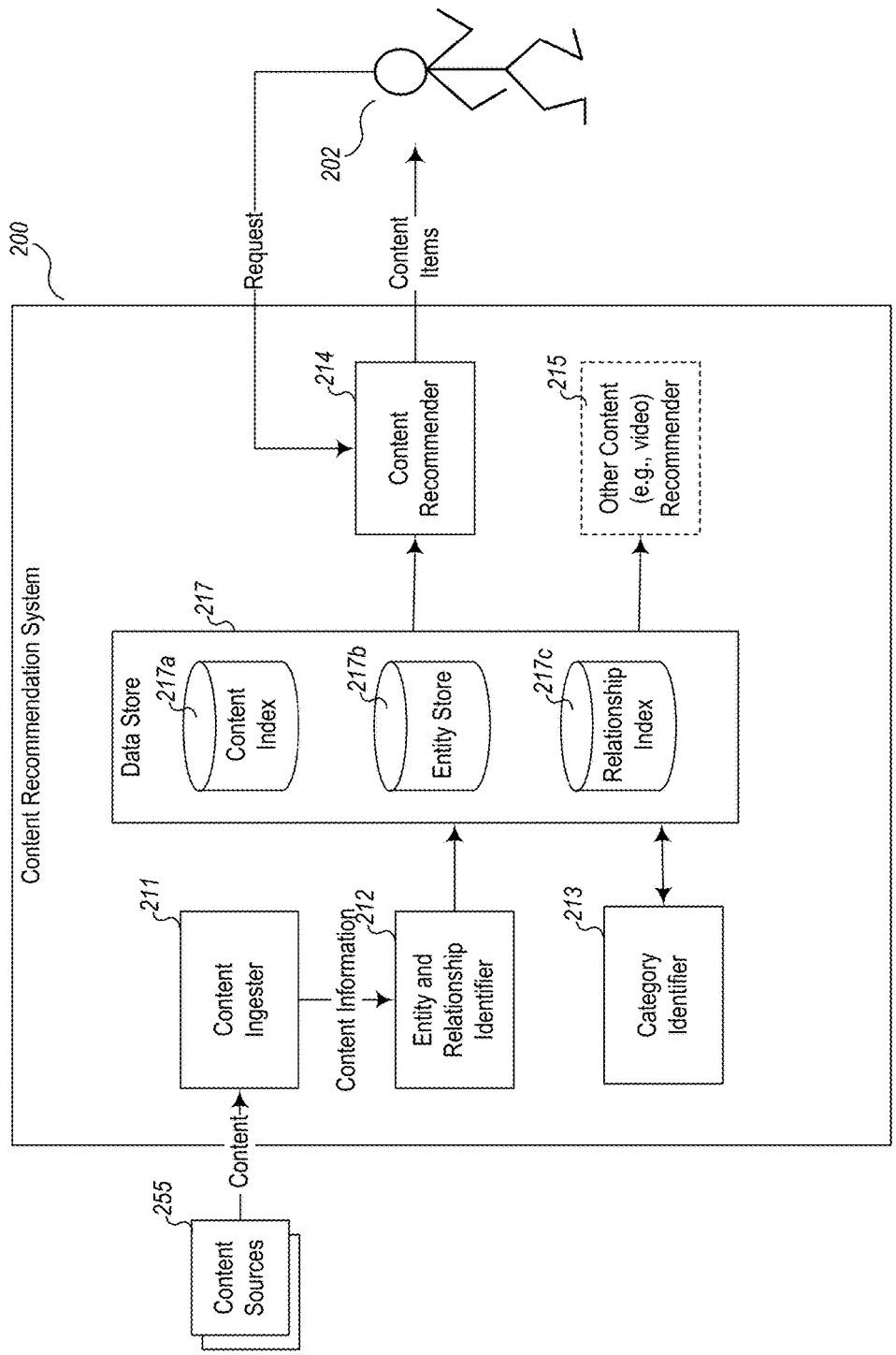
FIG. 2 illustrates an example block diagram of an example embodiment of a content recommendation system.

FIG. 2 illustrates an example block diagram of an example embodiment of a content recommendation system. In particular, FIG. 2 illustrates a content recommendation system ("CRS") 200 that includes a content ingester 211, an entity and relationship identifier 212, a category identifier 213, a content recommender 214, an optional other content recommender 215, and a data store 217. The data store 217 includes a content index 217a, an entity store 217b, and a relationship index 217c.

The content ingester 211 receives and indexes content from various content sources 255, including sources such as Web sites, Blogs, news feeds, video feeds, and the like. The content ingester 211 may also receive content from non-public or semi-public sources, including subscription-based information services, access-controlled social networks, and the like. The content ingester 211 provides content information, including data included within content items (e.g., text, images, video) and meta-data about content items (e.g., author, title, date, source), to the entity and relationship identifier 212. The content information may be provided directly (as illustrated) and/or via some intermediary, such as the content index 217a.

The entity and relationship identifier 212 determines semantic information about content items obtained from the various content sources 255, and stores the determined information in the data store 217. More specifically, the entity and relationship identifier 212 receives content information from the content ingester 211 and identifies entities and relationships that are referenced therein. Various automatic and semi-automatic techniques are contemplated for identifying entities within content items. In one embodiment, the identifier 212 uses natural language processing techniques, such as parts of speech tagging and relationship searching, to identify sentence components such as subjects, verbs, and objects, and to identify and disambiguate entities. Example relationship searching technology, which uses natural language processing to determine relationships between subjects and objects in ingested content, is described in detail in U.S. Pat. No. 7,526,425, filed Dec. 13, 2004, and entitled "METHOD AND SYSTEM FOR EXTENDING KEYWORD SEARCHING FOR SYNTACTICALLY AND SEMANTICALLY ANNOTATED DATA" issued on Apr. 28, 2009, and example entity recognition and disambiguation technology is described in detail in U.S. patent application Ser. No. 12/288,158, (now U.S. Pat. No. 8,594,996), filed Oct. 15, 2008, and entitled "NLP-BASED ENTITY RECOGNITION AND DISAMBIGUATION," both of which are incorporated herein by reference in their entireties. Amongst other capabilities, the use of relationship searching, enables the CRS 200 to establish second order (or greater order) relationships between entities and to store such information in the data store 217.

For example, given a sentence such as "Sean Connery starred in Goldfinger," the identifier 212 may identify "Sean Connery" as the sentence subject, "starred" as the sentence verb (or action), and "Goldfinger" as the sentence object, along with the various modifiers present in the sentence. These parts-of-speech components of each sentence, along with their grammatical roles and other tags may be stored in the relationship index 217c, for example as an inverted index as described in U.S. Pat. No. 7,526,425. As part of the indexing process, the CRS recognizes and disambiguates entities that are present in the text. Indications of these disambiguated entities are also stored with the sentences information, when the sentence contains uniquely identifiable entities that the CRS already knows about. These entities are those that have been added previously to the entity store 217b. In some cases, the indexed text contains subjects and objects that indicate entities that are not necessarily known or not yet disambiguated entities. In this case the indexing of the sentence may store as much information as it has in index 217c, but may not refer to a unique identifier of an entity in the entity store 217b. Over time, as the CRS encounters new entities, and in some cases with the aid of manual curation, new entities are added to the entity store 217b. In the above example, "Sean Connery" and "Goldfinger" may be unique entities already known to the CRS and present in the entity store 217b. In this case, their identifiers will be stored along with the sentence information in the relationship index 217c. The identified verbs also define relationships between the identified entities. These defined relationships (e.g., stored as subject-action-object or "SAO" triplets, or otherwise) are then stored in the relationship index 217c. In the above example, a representation of the fact that the actor Sean Connery starred in the film Goldfinger would be added to the relationship index 217c. In some embodiments, the process of identifying entities may be at least in part manual. For example, entities may be provisionally identified by the identifier 212, and then submitted to curators (or other humans) for editing, finalization, review, and/or approval.

The content index 217a associates content items with one or more entities and categories, and vice versa, in order to support efficient searches such as searches for content items having a particular entity or for categories associated with a particular content item. For example, given an entity or category, the CRS 200 may provide a list of content items that reference that facet. In addition, given an indication of a content item, the CRS may provide a list of entities or categories referenced by that content item.

The entity store 217b is a repository of entities (e.g., people, organization, place names, products, events, things), concepts, and other semantic information. In at least some embodiments, the entities in the entity store 217b are related such that they form a semantic network, taxonomy, or graph. The entities in the entity store 217b are associated with categories/facets. The categories themselves are organized into one or more taxonomies based on taxonomic relations such as is-a, part-of, member-of, and the like. In addition, entities are associated with certain properties, such as name and aliases, a unique identifier, types and facets, descriptions, and the like. Entities may also have type/facet-specific properties. For example, for a sports athlete, common properties may include: birth place, birth date, sports teams, player positions, awards, and the like. Note that some of the properties are relational, that is, the property value may itself be another entity in the entity store 217b. For example, the team property for an athlete may be link to a sports team entity in the entity store 217b, and vice versa. Thus, the entities in the entity store 217b are interconnected through the property links, creating a semantic network or graph. Certain taxonomic relations are represented as such property links (e.g., the "member-of" relation for the players-team relation, and team-league relation in the sports domain). In some embodiments, the entities, their taxonomic paths and/or properties are extracted from one or more structured and semi-structured sources (e.g., Wikipedia). In other embodiments, the process of identifying entities may be at least in part manual. For example, entities may be provisionally identified by the content ingester 211, and then submitted to humans for editing, finalization, review, and/or approval.

The category identifier 213 determines category-related semantic information about content items obtained from the various content sources 255, and stores the determined information in the data store 217. More specifically, the category identifier 213 receives content information from the content ingester 211 and entity and relationship information from the entity and relationship identifier 212, and determines categories associated with the entities referenced by content items. The category identifier 213 thus associates categories with content items, and store such associations in the data store 217, such as by annotating content items stored in the content index 217a. The category identifier 213 may perform other or additional category-related functions, such as identifying popular or trending categories, summarizing categories by determining popular entities in the category, or the like.

The content recommender 214 provides indications of content items in response to a request received from a user 202 or a device operated by the user 202. In one embodiment, the content recommender 214 provides an interface (e.g., a Web-based interface, an application program interface) that receives requests/queries that specify one or more categories. In response, the content recommender 214 determines content items that are related to at least one of the one or more categories, and provides (e.g., transmits, sends, forwards) indications of the determined content items. In another embodiment, the content recommender 214 operates in a "push" model, where it provides a stream or feed of content items related to one or more categories.

The optional other content recommender 215 provides recommendations of other types of content obtained from or provided by third-party services/sources. In some embodiments, the recommender 215 may query third-party services to retrieve other media types (e.g., videos, podcasts, social media messages) that may not be included in the content index 217a. In one embodiment, the recommender 215 may, given a specified category, automatically construct a query adapted for a third-party information/content service by taking the top entities (e.g., top three) from a list of current and popular entities for the specified category.

In addition, although the described techniques for content recommendation are illustrated primarily with respect to textual content, other types of content are contemplated. In one embodiment, the CRS 200 may utilize at least some of the described techniques to perform or facilitate the category-based recommendation of content items based on other types of content, including advertisements, audio (e.g., music), video, images, and the like. In some embodiments, the CRS 200 is configured to ingest video streams (e.g., live streaming of sports games) in a similar fashion. In particular, the CRS 200 may obtain text content from the stream via either closed captions or speech recognition. Then, the CRS 200 analyzes the obtained text content as discussed above, such that the CRS 200 can provide category-based recommendations for such content items as well.

Furthermore, the described techniques are not limited to the specific architecture shown in FIG. 2. For example, in some embodiments, content ingestion and relationship identification may be performed by another (possibly external or remote) system or component, such as a stand-alone content indexing, search, and discovery system. In other embodiments, the CRS 200 may not interact directly with users as shown, but rather provide user interface components (e.g., recommender widgets, plug-ins) that may be embedded or otherwise incorporated in third-party applications or systems, such as Web sites, smart phones, desktop systems, and the like.

Although the techniques of category-based content recommendation and the CRS are generally applicable to any type of content item, the phrase "content item" is used generally to refer to or imply any type of information and/or data, regardless of form or purpose. For example, a content item may be in textual or binary format, or a content item may be a news item, a report, an image, an audio source, a video stream, a code module (e.g., an application, an executable), an online activity (e.g., to purchase a good or service), or the like. Essentially, the concepts and techniques described are applicable to any category-based recommendation system. Also, although certain terms are used primarily herein, other terms could be used interchangeably to yield equivalent embodiments and examples. For example, the term "category" and "facet" are used interchangeably. Other terms for category may include "class," "property-based set," or the like. In addition, terms may have alternate spellings which may or may not be explicitly mentioned, and all such variations of terms are intended to be included.

Example embodiments described herein provide applications, tools, data structures and other support to implement a content recommendation system to be used for recommending content items, such as news items, that belong to a particular category. Other embodiments of the described techniques may be used for other purposes, including for category-based recommendation of technology reports (e.g., reviews of computer systems, programs, games, mobile devices). In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the code flow, different code flows, etc. Thus, the scope of the techniques and/or functions described are not limited by the particular order, selection, or decomposition of steps described with reference to any particular routine.

3. Example Screen Displays for Category-Based News Item Recommendation

Figure 3A:
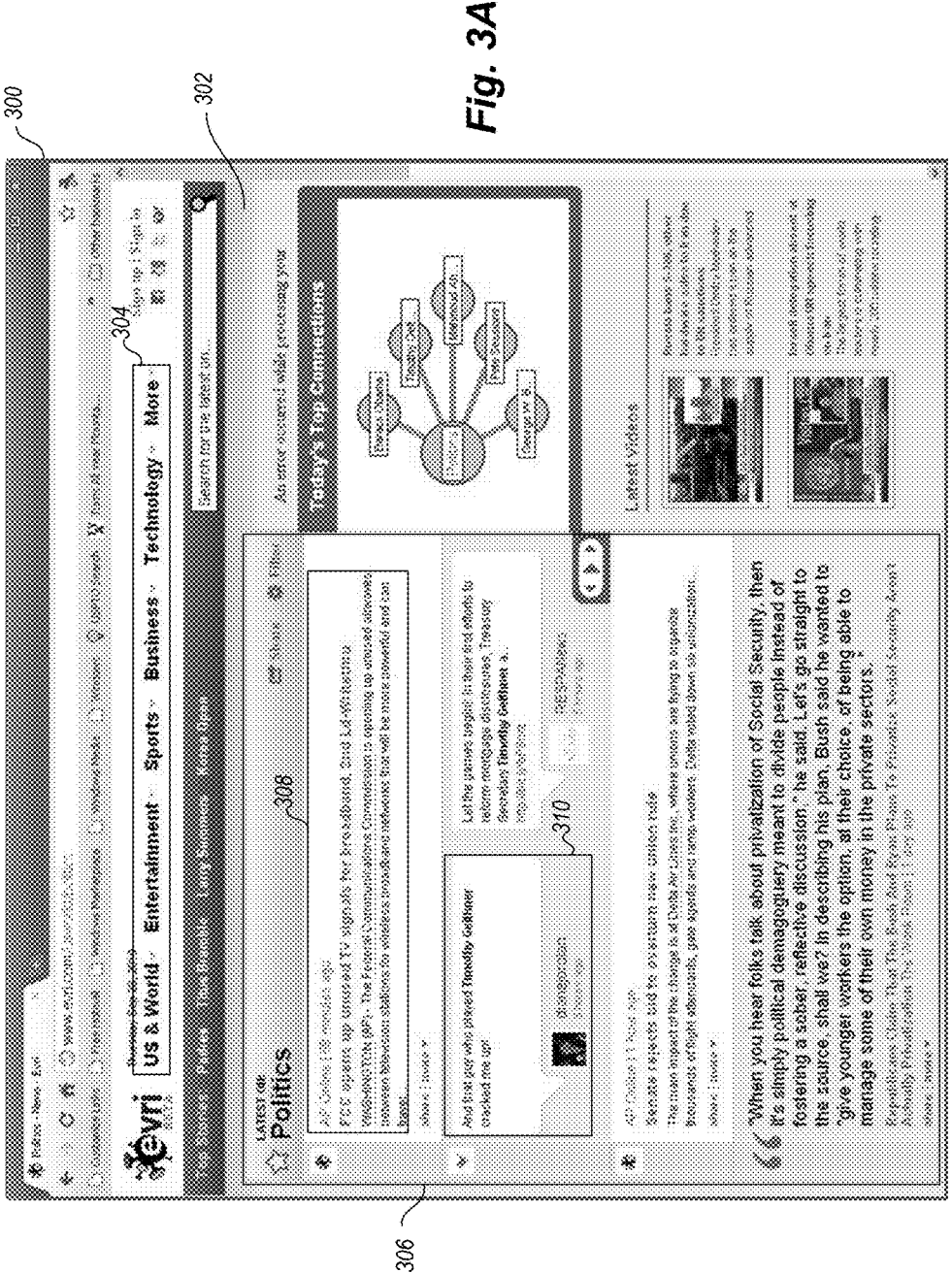
FIGS. 3A-3C illustrate example screen displays provided by an example embodiment of a content recommendation system.
Figure 3B:
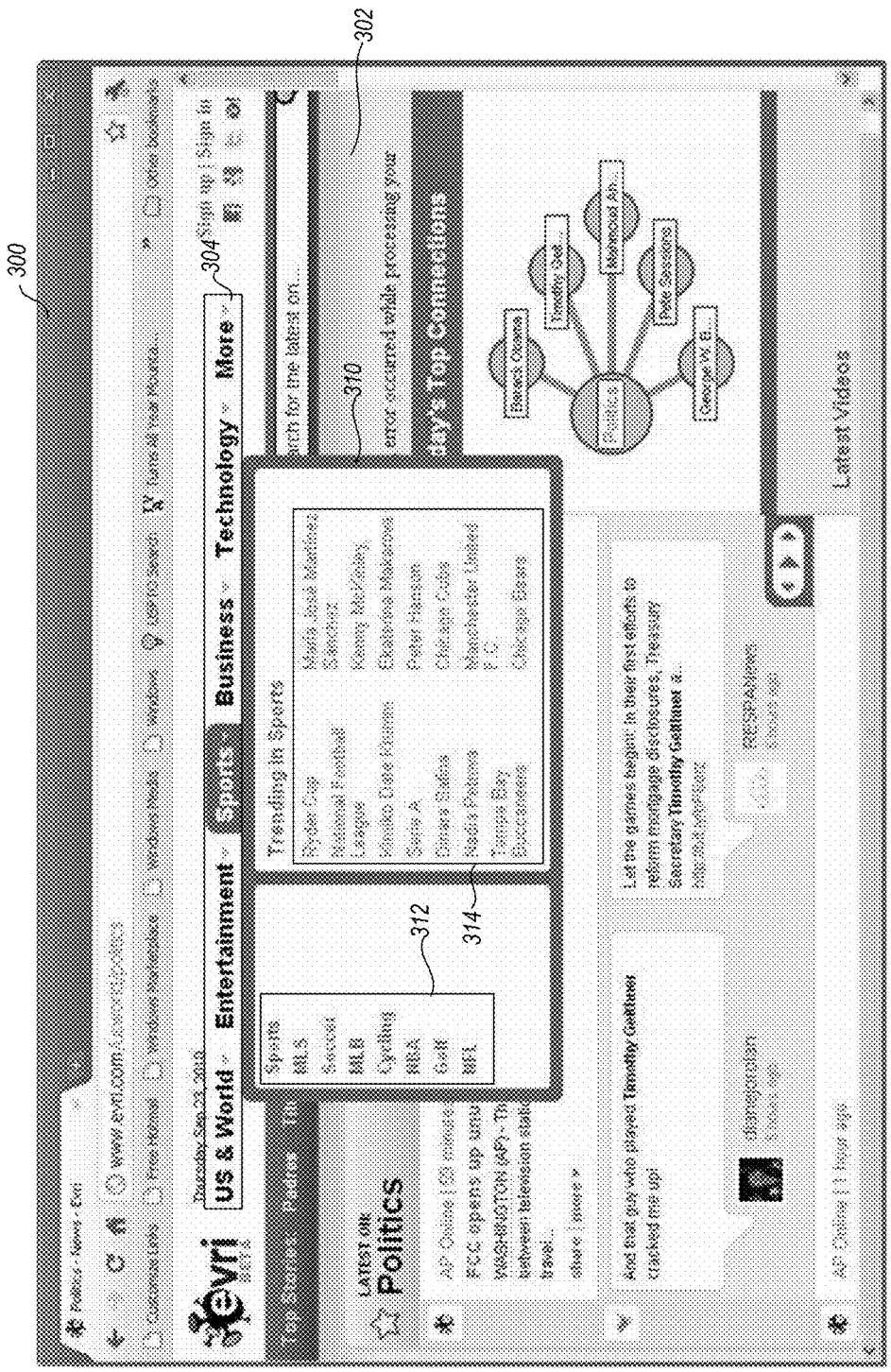
Figure 3C:
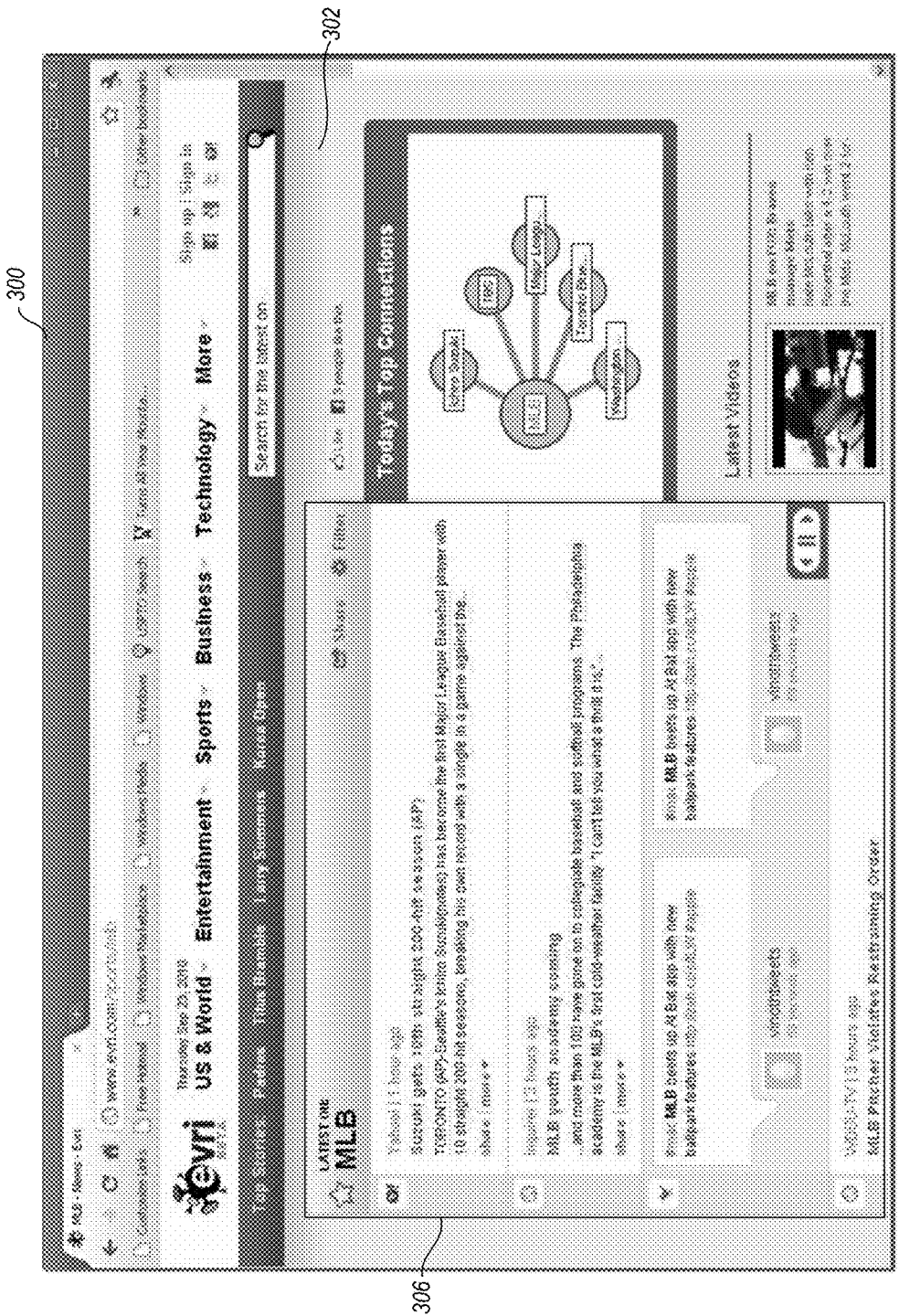

FIGS. 3A-3C illustrate example screen displays provided by an example embodiment of a content recommendation system. In particular, FIG. 3A illustrates a Web browser 300 that displays a screen 302 (e.g., defined by a received Web page) that is being used by a user to interact with the content recommendation system to view news items organized by category. The screen 302 includes a menu bar 304 and a news items area 306. The menu bar 304 includes multiple controls, here labeled "US & World," "Entertainment," "Sports," "Business," "Technology," and "More." The multiple controls allow a user to specify a particular category for which he wishes to view news items. In this example, the user has specified a Politics category, and in response, the news items area 306 is updated to present news items that are related to the specified category.

The news items area 306 includes multiple news item snippets, such as snippets 308 and 310. Each snippet provides information about a news item, such as the title of the news item, some of text from the news item, the source of the news item, or the like. For example, snippet 308 provides information about an AP Online story, including its title ("FCC opens up unused TV signals for broadband") and some of its text ("The Federal Communications Commission is opening up unused airwaves between television stations . . . "). Note that the news item presented via snippet 308 does not mention the term politics. Rather, the CRS has determined that various entities referenced in the news item (e.g., the FCC) are entities that are in some manner related to the Politics category. Snippet 310 provides information about a social media message, in this case a post from the Twitter micro-blogging service. Again, the underlying social media message presented via snippet 310 does not include the term politics. Instead, the CRS has determined that the referenced entity Timothy Geithner is related to the Politics category.

FIG. 3B illustrates the specification of a content item category by a user. In particular, in FIG. 3B, the user has selected the control labeled "Sports" in the menu bar 304. In response, a category selector menu 310 has been presented. The menu 310 includes a category section 312 and a trend section 314. The category section 312 indicates multiple categories that are related to the general Sports category, including MLS (Major League Soccer), Soccer, MLB (Major League Baseball), Cycling, and the like. The trend section 314 indicates multiple entities that have been identified by the CRS as popular, emerging, and/or "trending." Trending entities or categories include those that have been recently (e.g., in the last day, week, month) been receiving an increase in attention, for example measured by number of page views, number of news stories, or the like. A trending entity/category may be identified by measuring activity (e.g., number of news stories) with respect to historical averages for the trending entity/category and/or with respect to other entities/categories.

FIG. 3C illustrates content items presented in response to specification of a content item category by a user. In particular, in FIG. 3C, the user has selected the category labeled "MLB" displayed in the category section 312 of FIG. 3B. In response, the category section 306 of the Web page 302 is updated to present news items that are about or in some manner reference the category Major League Baseball.

Although the category-based content recommendation techniques of FIGS. 3A-3C have been described primarily with reference to Web-based technologies, the described techniques are equally applicable in other contexts. For example, category-based content recommendation may be performed in the mobile computing context, such as via a newsreader application/module or other type of code module that is configured to execute on a mobile device (e.g., a smart phone) in order to present news or other content items for consumption by a user.

4. Entity Identification and Category Aggregation in an Example Embodiment

FIGS. 4A-4D illustrate example data processed and/or utilized by an example embodiment. In particular, FIGS. 4A-4D illustrate various types of data used to support a running example of entity and category identification and aggregation performed by an example embodiment of a content recommendation system.

Figure 4D:
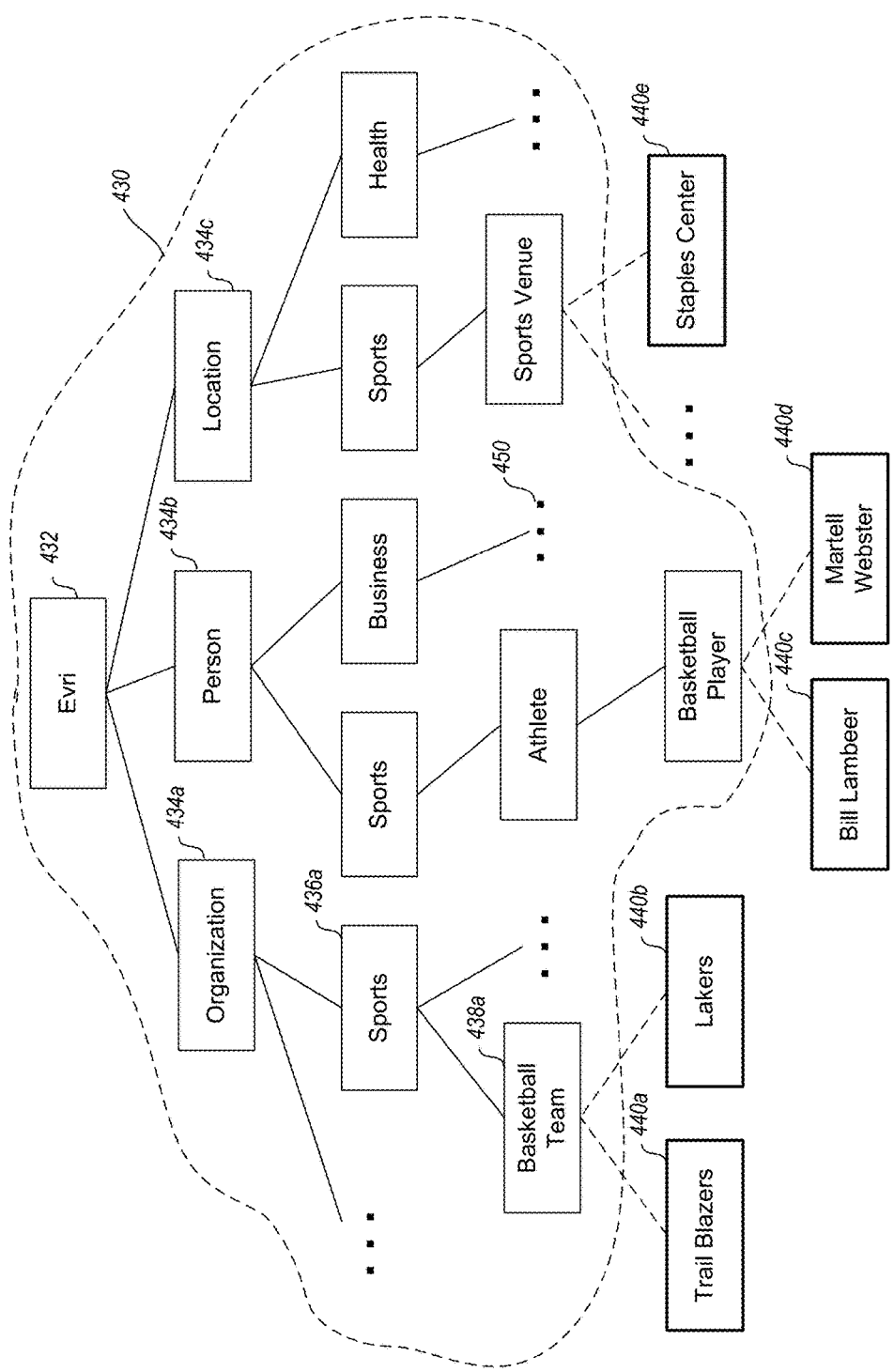

FIGS. 4A and 4B show a representation of two entities. In particular, FIGS. 4A and 4B illustrate XML-based representations of a basketball player entity named Martell Webster and a basketball team entity named the Portland Trailblazers, respectively. In FIG. 4A, Martell Webster is represented by structure 400, which includes a facets section 402, a name section 404, a properties section 406, and a type section 408. The facets section 402 represents one or more facets/categories, each of which includes a facet name (e.g., Basketball Player) and a taxonomic path, which is a path in a taxonomic tree or other type semantic graph. An example taxonomic graph is described with respect to FIG. 4D, below. The name section 404 represents a name (e.g., "Martell Webster") for the illustrated entity. The properties section 406 represents one or more properties of the entity, which are name-value pairs that describe some aspect of the entity. In this example, the properties are birth_date=Dec. 4, 1986 and sports_league=NBA. The type section 408 indicates a "top level" category to which the entity belongs, in this case PERSON.

In FIG. 4B, the Portland Trailblazers team is represented by a structure 410, which includes a facets section 412, a name section 414, a properties section 416, and a type section 418. The sections 412-418 include, represent, or indicate data of types similar to those described with respect to sections 402-408 of FIG. 4A. Here, the entity has a facet/category of Basketball Team (section 412), a name of "Portland Trail Blazers" (section 414), properties of sports_league=NBA and number_championships=3 (section 416), and a type of ORGANIZATION (section 418). As discussed above, entities such as the ones described with respect to FIGS. 4A and 4B may be stored in an entity repository, such as the entity store 217b of FIG. 2.

FIG. 4C illustrates an example content item. In particular, FIG. 4C illustrates a news item 420, which is a news story about a basketball game between the Portland Trailblazers and the Los Angeles Lakers. The news item 420 includes entity references 422a-422g. The CRS processes the text of the news item 420, recognizes the entity references 422a-422g, and determines (e.g., links) the references to corresponding entities stored in the entity store. For example, references 422a, 422d, and 422f are linked to the Portland Trailblazers entity described with respect to FIG. 4B; references 422b and 422g are linked to a Los Angeles Lakers entity; reference 422c is linked to the Martell Webster entity described with respect to FIG. 4A; and reference 422d is linked to a Staples Center entity.

Next, the CRS ranks the tagged entities by their importance and relevance to the main subject of the content item. The ranking may be based on one or more of the following factors: number of mentions (e.g., references) of each entity in the text; positions of the mentions in the text (e.g., entities appearing in document title may be weighted more; entities appearing earlier in the text would be weighted more than the ones appearing later in the text; entities appearing in boilerplate text may be weighted less); and penalties to certain types of entities (e.g., if the publisher of the document appears in the text, it may be weighted less).

FIG. 4D a portion of an example taxonomic tree. In particular, FIG. 4D illustrates a taxonomic graph 430. The illustrated taxonomic graph 430 is a tree that represents a hierarchy of categories that each have zero or more child categories connected via an arc or link representing a relation. The hierarchy begins with a unique root category (here labeled "Evri") 432, which has child categories 434a-434c, respectively labeled Organization, Person, and Location. Category 434a has child category 436a, which in turn has child category 438a. Portions of the graph 430 that are not shown are illustrated by ellipses, such as ellipses 450. FIG. 4D also illustrates entities 440a-440e, linked to their respective categories (e.g., via an is-a relation). For example, entities 440a (Trail Blazers) and 440b (Lakers) are Basketball Teams (438a). Although the illustrated graph 430 is a tree in the illustrated embodiment, in other embodiments other graph structures may be utilized, including general directed or undirected graphs.

Nodes in the graph 430 also have associated levels, where the root is at the first level, categories at the level of category 434a are at the second level, categories at the level of category 436a are at the third level, and so on. When levels are counted starting from one, the level of a category is defined as one plus the number of arcs/links that must be traversed to reach the root category.

A taxonomic path is a path between one category and another in the graph 430. For example, the path connecting categories 432, 434a, 436a, and 438a form a taxonomic path that specifies the Basketball Team category as well as all of its ancestor categories up to the root of the graph 430. The path connecting categories 432, 434a, 436a, and 438a, may also be denoted textually as: Evri/Organization/Sports/Basketball_Team.

In the processing of the example content item shown in FIG. 4C, a resulting ranked list of entities (in non-increasing order), along with their respective taxonomic paths, may be:

1. Portland Trail Blazers [Evri/Organization/Sports/Basketball_Team]
2. Los Angeles Lakers [Evri/Organization/Sports/Basketball_Team]
3. Martell Webster [Evri/Person/Sports/Athlete/Basketball_Player]
4. Staples Center [Evri/Location/Sports/Sports_Venue]

In the illustrated example, the above ranking results due to the relative number of mentions of the entities in the news item of FIG. 4C. In particular, the Portland Trail Blazers are mentioned three times, the Los Angeles Lakers and Martell Webster are each mentioned twice, and the Staples Center is mentioned once.

In the next step, the CRS assigns categories to the content item, based on the ranked list of entities. The CRS takes the top K entities from the ranked list. In one implementation, K=5. By taking the top K entities, the CRS includes only the entities that are relatively important and relevant to the document. Then, the CRS derives categories by aggregating the common nodes in the taxonomic paths of the top entities, as well as their properties, as described below.

First, the CRS counts the third-level nodes in the taxonomic paths, which correspond to the major topic domains (e.g., Politics, Entertainment, Sports, Business, Technology, Heath, Food, etc.). In FIG. 4D, these are categories at the level of category 436a (e.g., Sports, Business, Health). The CRS then ranks the topic domains by their frequency. Next, the CRS takes the top two highest ranked topic domains and assigns them as category to the document. In the above example, all the entity taxonomic paths share a common top-level node [Sports]. Therefore, the CRS assigns the category "Sports" to the given document.

Second, the CRS ranks the leaf nodes (facets) of the taxonomic path, based on the number of entities having the facet and/or the rank of the entity in the ranked entity list. In the above example, the ranked list of facets would be: (1) Basketball Team (because the Trail Blazers and Lakers are both basketball teams), (2) Basketball Player (because Martell Webster is a basketball player), and (3) Sports Venue (because the Staples Center is a sports venue). Those facets would be assigned to the document as facet categories.

Other or additional processing may also be performed. For example, any levels or individual nodes/paths in the taxonomy may be selected as a category, and the same entity aggregation process can then be applied. For example, the CRS may assign a category "entertainment_people" by aggregating entities that share taxonomic path [Evri/Person/Entertainment]. Similarly, by aggregating on path [Evri/Person/Sports/Athlete], the CRS would create an "athletes" category that covers players in all kinds of sports.

Besides nodes/paths in the taxonomy, the CRS may also support configurable categories based on entity properties. This allows the CRS to create categories from any group of entities that share a common property. A configuration is a set of key-value pairs, where the key is a facet, and the value is a list of properties to be checked. For example, a basketball player entity may have the following configuration: Facet (key)=Basketball Player and Properties (value)=Sports League.

During processing of a document, the CRS processes the list of entities assigned to the content item. For each entity, the CRS takes its facets, and performs a lookup against its configuration. If there is a match, the CRS obtains the property list from the configuration. Then, the CRS retrieves the entity's corresponding entry from the entity store. The CRS then processes the entity's properties available in the entity store, and determines if the entity has the property specified in the configuration. If a match is found, the CRS adds the property value as a potential category.

For example, leaf nodes in the example taxonomy of FIG. 4D are Basketball_Player and Basketball_Team. The CRS can assign finer granularity categories (e.g., NBA basketball, NCAA college basketball, FIBA international basketball), by using a property configuration. As shown above in FIGS. 4A and 4B, basketball players and teams have a property "Sports League" in the Entity-Store. In our example, the entities are:

Portland Trail Blazers—Sports_League=NBA
Los Angeles Lakers—Sports_League=NBA
Martell Webster—Sports_League=NBA Again, by aggregating the specified properties from the ranked list of entities, the CRS extracts the top categories (NBA basketball in this case), and assigns them to the content item, as discussed further below.

As described above, in one embodiment, certain categories are always detected by default, while others can be specified through a configuration. To decide what categories to populate in the index, human curators may select the categories manually based on their knowledge of popular topics in the news as well as scheduled events (e.g., Oscars Academy Award, March madness college basketball). Another approach includes automated popularity ranking and detection of emerging categories, by looking at popularity of individual entities and aggregating to the category level. The sources of entity popularity may include one or more of:

Frequency counts in an index of news articles, as well as a corresponding timeline used in order to detect emerging entities that have rising popularity.
User clicks on entities.
Wikipedia page view counts (e.g., Wikipedia traffic statistics on an hourly basis are publicly available from sources such as http://stats.grok.se).
Number of mentions in Tweets or other social media messages, obtained through the Twitter API, for example.
Popular/trending queries from search engines such as Google and Yahoo.

5. Category Indexing in an Example Embodiment

In one embodiment, for the underlying information retrieval capability, the CRS uses a typical Vector Space Model ("VSM") based system. An example of such systems is Apache Lucene. The vector space model procedure can be divided in to three stages. The first stage includes document indexing where content bearing terms are extracted from content item text and indexed/stored. The second stage includes weighting of the indexed terms to enhance retrieval of content items relevant to a user. A common weighting scheme for terms within a content item is based on the frequency of term occurrence. The last stage includes ranking the content items with respect to a query according to a similarity measure.

In one embodiment, the CRS creates a special term for each category that is to be assigned to a content item in the index. As discussed above, during the indexing of a content item, the CRS identifies the top K entities in the content item, collects the facets assigned to the top entities, and then annotate the content item with those facets using special tokens (facet.basketball.team for the category/facet Basketball_Team). The tokens are treated as single terms in the index. During search time, given a facet category Basketball_Team as input, the CRS translates it into a query term "facet.basketball.team." Content items containing the query term can then be located and returned.

The CRS may retrieve and rank content items in the index by determining how relevant a given content item is to a user's query. In one embodiment, the more times a query term appears in a content item relative to the number of times the term appears in all the content items in the collection, the more relevant that content item is to the query. This is accomplished by using TF-IDF (term frequency-inverse document frequency) weighting in the scoring of content items. As noted above, the CRS creates artificial tokens for the categories extracted from the content item. These tokens are thus not terms originally appearing in the content item text. However, the CRS can simulate the TF weights on the category tokens, by controlling how many times each token is added to the index. The frequency may be determined based on the importance measure of the categories that are computed when ranking the categories. Another option to use a binary document vector (e.g., true/false to indicate whether the document is assigned a particular category). With this approach, the CRS takes the top K categories from the document, and consider them as equally important, such that each category token is added to the index once.

In addition, some embodiments can influence search results by "boosting." The CRS may apply document level boosting, by specifying a boost value for a content item as it is added to the index. The boost value for each content item is computed as a combination of the item's source credibility (e.g., articles from more credible or popular sources are weighted more) and publishing date (e.g., fresher or more recent articles are weighted more).

The CRS may be configured to retrieve recently published content items from credible sources. In order to do so, the CRS may assign to each content item source a credibility score (e.g., 1 to 5), which is translated into a credibility weight. Source credibility can be assigned manually and/or computed based on some properties of a source (e.g., search engine rank of a source web page, Internet traffic to the source web page, etc.). Credibility weight can then be multiplied by recency weight to form a boost value for a content item. Recency weight may be based on the difference between the publishing date of a document and the date when ingestion started.

6. Category-based Content Item Retrieval

In one embodiment, for a given category, the CRS returns a list of relevant and recent content items that are associated with the category in the index. The relevance ranking is based on factors such as: query matching, based on TF-IDF weighting as described above; source credibility; and/or publication date.

In one embodiment, the CRS generates a news stream for a given category by providing popular, fresh, and or breaking news items that are associated with the category. Popular or breaking news stories tend to be covered by multiple sources, get updated more frequently, and have more follow-up stories. Thus, the CRS may capture popular stories by determining its coverage in terms of the number of similar articles.

After retrieving a list of relevant news articles, the CRS may collapse the similar articles that cover the same topic into a group. The similarity between two articles is computed based on one or more of: distance between document signatures computed during index; overlap between article titles; overlap between article summaries; source URLs; and/or publisher. If the similarity measure exceeds some threshold, then two articles are considered as similar.

In one embodiment, the CRS detects similar documents by computing a signature (e.g., a hash key of fixed length) of a document summary. A document summary is a snippet of the document text that best represents the document subject and best matches the search query. To determine a document summary, the CRS may scan through the document text, and select a snippet of a pre-determined window size, by maximizing a combination of the following measures: the density of the document's top entities appearing in the snippet and overlap of the words in the snippet with the words in the document title.

In one embodiment, the logic for determining whether articles A and B are similar is as follows: if the article URLs are identical, return true; else if the Hamming distance between the two article signatures is lower than a pre-determined threshold, return true; else if overlap between article titles is higher than a threshold, and overlap between article summaries is higher than a threshold, return true; else, return false.

By using the above logic, articles that cover the same story are grouped together. In one embodiment, each group contains a head article, and underneath is zero or more similar articles. Article groups may then be ranked by various factors, including one or more of: the number of articles in each group (e.g., the larger the group size, usually the more popular the story is); publication dates of the articles, preferring recently published articles; and/or source diversity of the articles, preferring stories covered by many different sources.

As discussed above, some embodiments of the CRS may also determine popular, trending, or recent entities for a given category. In one embodiment, in addition to retrieving news articles, the CRS also produces a summary list of entities/concepts that are most popular at a current time for the given category. The popular entities may be extracted and ranked based on entity occurrences in the top articles returned for the given category. In one embodiment, the CRS iterates through the top articles in a result set, takes the top entities from each article (top entities for each article are stored in the index), and aggregates the occurrence frequency of each entity. Popular entities may be further extracted and ranked based on entity popularity scores in an entity store. From the entity store, the CRS may retrieve a list of entities that belong to the specified category, ranked by their scores. The score for each entity may be computed based on the total number of recent articles (in the content store) that mention the entity and/or user visit traffic to the entity's page (e.g., via the CRS and/or external sites such as Wikipedia).

7. Third-party Content Retrieval

As noted above, the CRS may be configured to return, in response to a search or other request, indications of content items from external (e.g., third-party) sources. Third-party sources may include or provide content items of various media types (e.g., images, videos, audio, social media messages), some of which may not be indexed by the CRS. The CRS may be configured to retrieve results via external APIs or other retrieval facilities provided by the third-party sources. In some cases, a third-party source may not have or utilize the same category-based approach used by the CRS. In such cases, the CRS may translate categories used in the CRS to an approximation query that would retrieve from the third-party source content items similar to those that could be retrieved via the CRS itself. In one embodiment, categories may be translated into keywords used as part of a search query. However, such an approach may not provide good result coverage. This problem may be exacerbated for certain media types, such as images, videos, and social media messages (e.g., tweets), where the textual content is typically very short. For example, using keyword query "NBA Basketball" may not find videos or tweets that are about championship games between the Los Angeles Lakers and Boston Celtics, where the words "NBA" and "basketball" are not mentioned in the text, even though such content items are clearly related to NBA Basketball.

In another approach, for a given category, the CRS generates a keyword query where the keywords are based on the entities related to the given category. In particular, the CRS takes the top entities (e.g., most popular and recent) within the category, and uses the names and/or aliases of such entities to construct keyword queries against the third-party service. Thus, if the category is NBA Basketball, the CRS may construct a query that includes names of multiple (e.g., five) popular NBA Basketball entities, such as the Los Angeles Lakers, Boston Celtics, LeBron James, and the like. Queries may be enhanced using techniques similar to those mentioned in U.S. Patent Application No. 61/256,851, filed Oct. 30, 2009, and entitled "IMPROVING KEYWORD-BASED SEARCH ENGINE RESULTS USING ENHANCED QUERY STRATEGIES," incorporated herein by reference in its entirety.

In addition, in some cases third-party sources may use descriptors or other indicators (e.g., tags) that can be mapped, translated, or otherwise related to categories utilized in the CRS. For example, a video sharing service may have "channels" or other higher-level grouping constructs that can be mapped (manually or automatically) to CRS categories. As another example, a social messaging service (e.g., Twitter) may provide streams from credible sources that can be related to one or more CRS categories. In general, such mappings may be compiled or generated through automated discovery and/or manual curation. Once a mapping has been established, the CRS can generate a query for a third-party source by translating an indicated category into a corresponding descriptor used by the third-party source.

8. Example Computing System and Processes

Figure 5:
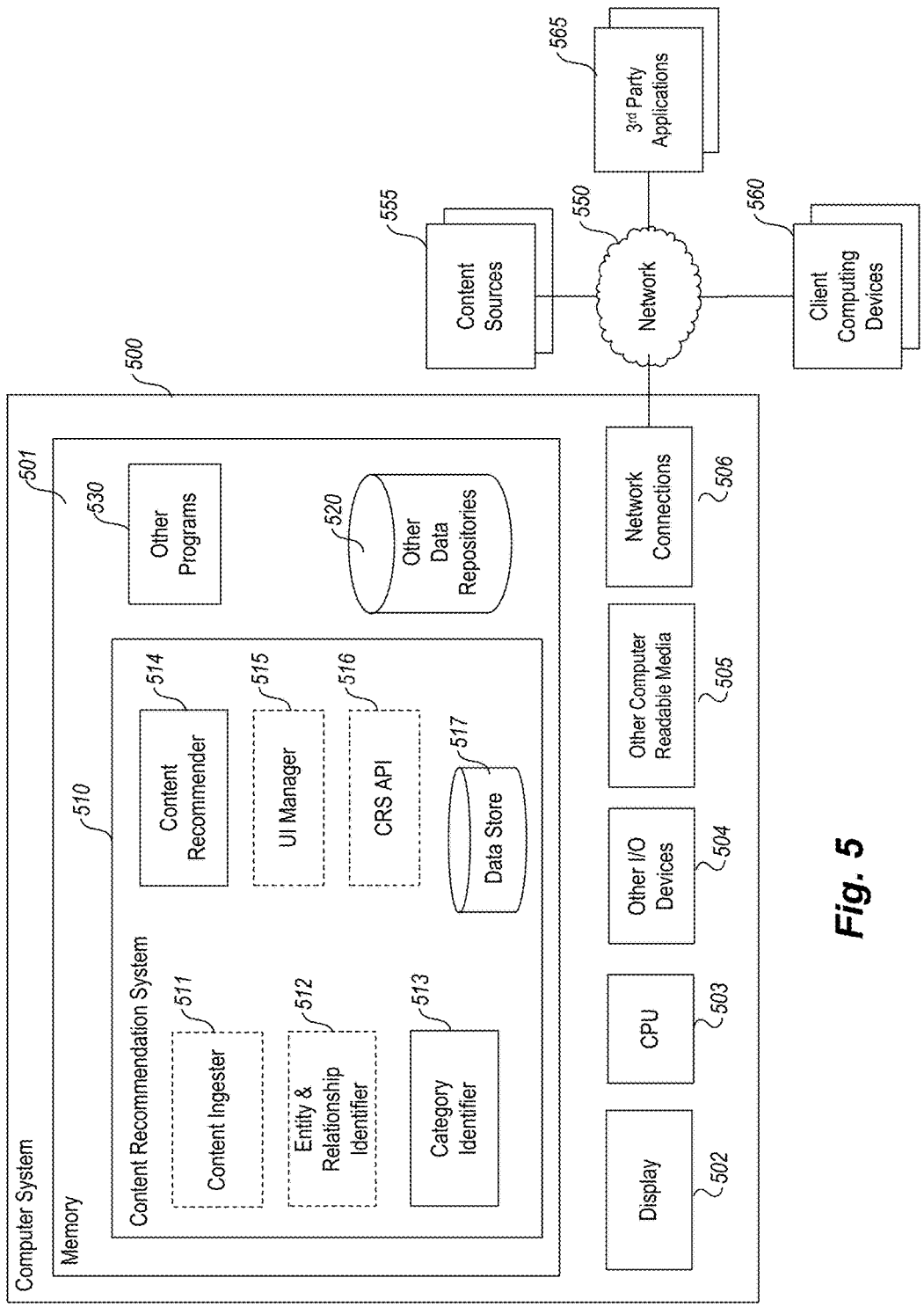
FIG. 5 is an example block diagram of an example computing system for implementing a content recommendation system according to an example embodiment.

FIG. 5 is an example block diagram of an example computing system for implementing a content recommendation system according to an example embodiment. In particular, FIG. 5 shows a computing system 500 that may be utilized to implement a content recommendation system 510.

Note that one or more general purpose or special purpose computing systems/devices may be used to implement the content recommendation system 510. In addition, the computing system 500 may comprise one or more distinct computing systems/devices and may span distributed locations. Furthermore, each block shown may represent one or more such blocks as appropriate to a specific embodiment or may be combined with other blocks. Also, the content recommendation system 510 may be implemented in software, hardware, firmware, or in some combination to achieve the capabilities described herein.

In the embodiment shown, computing system 500 comprises a computer memory ("memory") 501, a display 502, one or more Central Processing Units ("CPU") 503, Input/Output devices 504 (e.g., keyboard, mouse, CRT or LCD display, and the like), other computer-readable media 505, and network connections 506. The content recommendation system 510 is shown residing in memory 501. In other embodiments, some portion of the contents, some or all of the components of the content recommendation system 510 may be stored on and/or transmitted over the other computer-readable media 505. The components of the content recommendation system 510 preferably execute on one or more CPUs 503 and recommend content items, as described herein. Other code or programs 530 (e.g., an administrative interface, a Web server, and the like) and potentially other data repositories, such as data repository 520, also reside in the memory 501, and preferably execute on one or more CPUs 503. Of note, one or more of the components in FIG. 5 may not be present in any specific implementation. For example, some embodiments may not provide other computer readable media 505 or a display 502.

The content recommendation system 510 interacts via the network 550 with content sources 555, third-party applications 565, and client computing devices 560. The network 550 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The devices 560 include desktop computers, notebook computers, mobile phones, smart phones, tablet computers, personal digital assistants, and the like.

In a typical embodiment, the content recommendation system 510 includes a content ingester 511, an entity and relationship identifier 512, a category identifier 513, a user interface manager 515, a content recommendation system application program interface ("API") 516, and a data store 517. The modules 511-514 respectively perform functions such as those described with reference to modules 211-214 of FIG. 2. The content ingester 511, entity and relationship identifier 512, user interface manager 515, and API 516 are drawn in dashed lines to indicate that in other embodiments, functions performed by one or more of these components may be performed externally to the content recommendation system 510. For example, a separate content indexing and search system may host the content ingester 511, entity and relationship identifier 512, and at least some of the data store 517.

The UI manager 515 provides a view and a controller that facilitate user interaction with the content recommendation system 510 and its various components. For example, the U I manager 515 may provide interactive access to the content recommendation system 510, such that users can search for content items related to specified categories. In some embodiments, access to the functionality of the UI manager 515 may be provided via a Web server, possibly executing as one of the other programs 530. In such embodiments, a user operating a Web browser executing on one of the client devices 560 can interact with the content recommendation system 510 via the UI manager 515. For example, a user may manually submit a search for content items related to a specified category.

The API 516 provides programmatic access to one or more functions of the content recommendation system 510. For example, the API 516 may provide a programmatic interface to one or more functions of the content recommendation system 510 that may be invoked by one of the other programs 530 or some other module. In this manner, the API 516 facilitates the development of third-party software, such as user interfaces, plug-ins, news feeds, adapters (e.g., for integrating functions of the content recommendation system 510 into Web applications), and the like.

In addition, the API 516 may be in at least some embodiments invoked or otherwise accessed via remote entities, such as code executing on one of the client devices 560 or as part of one of the third-party applications 565, to access various functions of the content recommendation system 510. For example, an application on a mobile device may obtain recommended content items for a specified category via the API 516. As another example, one of the content sources 555 may push content information to the content recommendation system 510 via the API 516. The API 516 may also be configured to provide recommendation widgets (e.g., code modules) that can be integrated into the third-party applications 565 and that are configured to interact with the content recommendation system 510 to make at least some of the described functionality available within the context of other applications.

The data store 517 is used by the other modules of the content recommendation system 510 to store and/or communicate information. In particular, modules 511-516 may use the data store 517 to record various types of information, including semantic information about content items, such as entities, categories, and relationships. Although the modules 511-516 are described as communicating primarily through the data store 517, other communication mechanisms are contemplated, including message passing, function calls, pipes, sockets, shared memory, and the like.

In an example embodiment, components/modules of the content recommendation system 510 are implemented using standard programming techniques. For example, the content recommendation system 510 may be implemented as a "native" executable running on the CPU 503, along with one or more static or dynamic libraries. In other embodiments, the content recommendation system 510 may be implemented as instructions processed by a virtual machine that executes as one of the other programs 530. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the content recommendation system 510, such as in the data store 517, can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 517 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the content recommendation system 510 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 6:
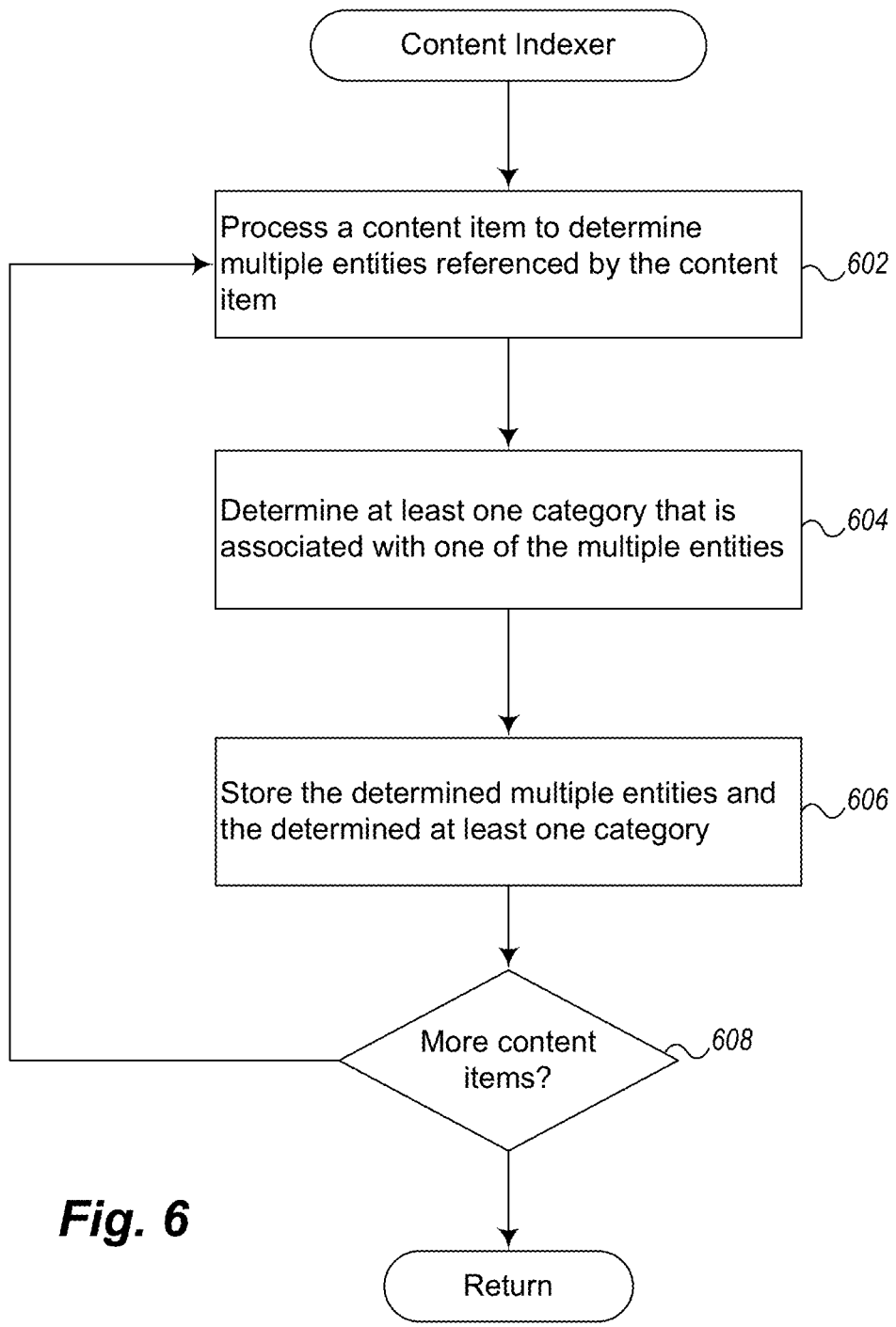
FIG. 6 is an example flow diagram of a content indexer process performed by an example embodiment.

FIG. 6 is an example flow diagram of a content indexer process performed by an example embodiment. In particular, FIG. 6 illustrates a process that may be implemented by, for example, one or more elements of the content recommendation system 200, such as the content ingester 211, entity and relationship identifier 212, and the category identifier 213, described with reference to FIG. 2. The process indexes content items by determining entities and categories related to the indexed content items.

The illustrated process begins at block 602, where it processes a content item to determine multiple entities referenced by the content item. Determining the multiple entities may include identifying entities referenced by the content item, each of the determined entities being electronically represented by the content recommendation system. Determining the multiple entities may further include ranking the entities on factor such as the number/quantity of mentions in the content item, the position of the mentions of the entity in the content item, and/or penalties based on the type of the entity.

At block 604, the process determines at least one category that is associated with one of the multiple entities. The determined at least one category may be part of a taxonomy stored by the content recommendation system and may be associated with one of the multiple corresponding entities referenced by the content item, as determined at block 602. Determining the at least one category may further include selecting a predetermined number of highest ranked entities from entities ranked at block 602, and then selecting and/or aggregating categories associated with the selected entities.

At block 606, the process stores the determined multiple entities and the determined at least one category. Storing the determined entities and categories may include annotating the content item (e.g., with a token that represents and entity or category) in an index or other data structure that supports efficient retrieval of content items.

At block 608, the process determines whether there are more content items. If so, the process proceeds to block 602, else returns.

Figure 7:
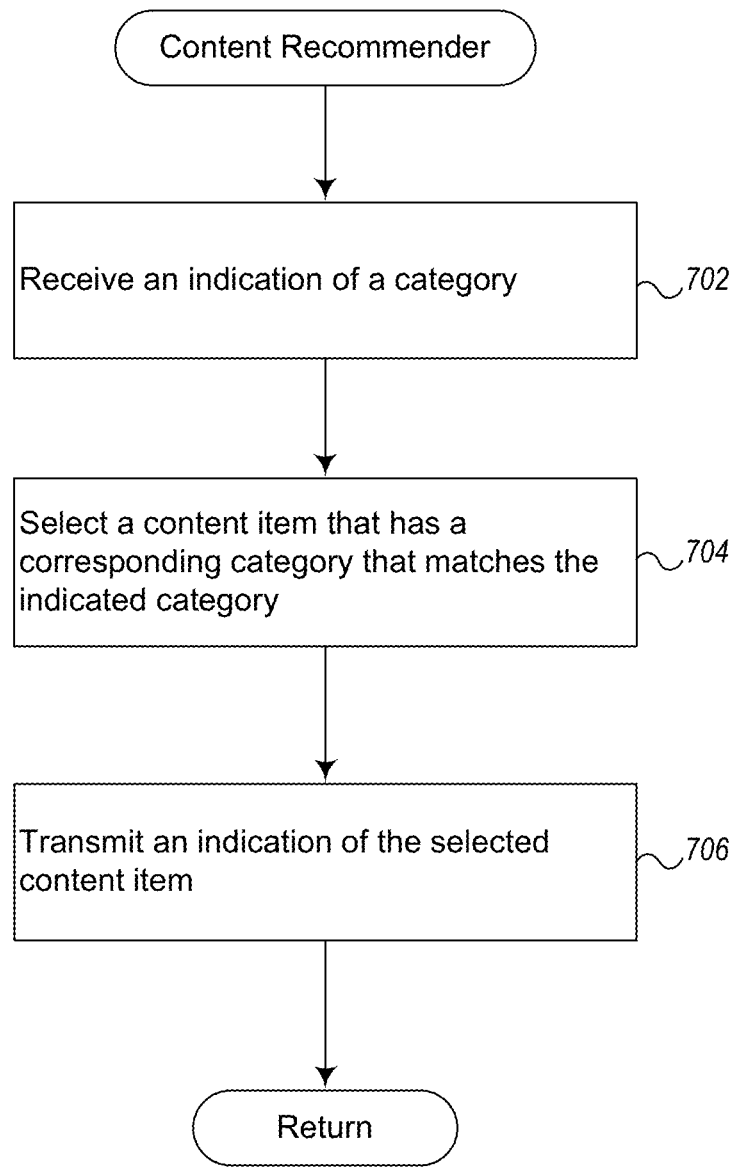
FIG. 7 is an example flow diagram of a content recommender process performed by an example embodiment.

FIG. 7 is an example flow diagram of a content recommender process performed by an example embodiment. In particular, FIG. 7 illustrates a process that may be implemented by, for example, one or more elements of the content recommendation system 200, such as the content recommender 214, described with reference to FIG. 2. The process provides content items that are related to a specified category, such as by responding to a search query.

The process begins at block 702, where it receives an indication of a category. In one embodiment, receiving the indication of the category includes receiving a search query/request that specifies the category.

At block 704, the process selects a content item that has a corresponding category that matches the indicated category. The corresponding category may be associated with one or more entities that are referenced by the selected content item and that are part of a taxonomy stored by the content recommendation system. Selecting the content item may include ranking multiple content items that reference the category, based on various factors, such as term frequency, the number of times a category token was added to the content item, a credibility score of the content item, and/or a recency score of the content item.

At block 706, the process transmits an indication of the selected content item. Transmitting the indication of the content item may include transmitting an identifier (e.g., a URL) and/or information about or from the content item (e.g., article title, summary, text).

Some embodiments perform one or more operations/aspects in addition to, or instead of, the ones described with reference to the process of FIG. 7. For example, in one embodiment, after block 706, the process may return to block 702 to receive and process additional category indications. In another embodiment, the process may also aggregate multiple selected content items, such that related content items are grouped together.

Example Entity Types

The following Table defines several example entity types in an example embodiment. Other embodiments may incorporate different types.

TABLE 1

Person
Organization
Location
Concept
Event
Product
Condition
Organism
Substance

Example Facets

The following Table defines several example facets in an example embodiment. Other embodiments may incorporate different facets.

TABLE 2

PERSON actor Evri/Person/Entertainment/Actor
PERSON animator Evri/Person/Entertainment/Animator
PERSON cinematographer Evri/Person/Entertainment/Cinematographer
PERSON comedian Evri/Person/Entertainment/Comedian
PERSON fashion_designer Evri/Person/Entertainment/Fashion_Designer
PERSON musician Evri/Person/Entertainment/Musician
PERSON composer Evri/Person/Entertainment/Musician/Composer
PERSON producer Evri/Person/Entertainment/Producer
PERSON director Evri/Person/Entertainment/Director
PERSON radio_personality Evri/Person/Entertainment/Radio_Personality
PERSON television_personality Evri/Person/Entertainment/Television_Personality
PERSON author Evri/Person/Entertainment/Author
PERSON model Evri/Person/Entertainment/Model
PERSON screenwriter Evri/Person/Entertainment/Screenwriter
PERSON playwright Evri/Person/Entertainment/Playwright
PERSON conductor Evri/Person/Entertainment/Conductor
PRODUCT film Evri/Product/Entertainment/Movie
PRODUCT television_show Evri/Product/Entertainment/Television_Show
PRODUCT album Evri/Product/Entertainment/Album
PRODUCT musical Evri/Product/Entertainment/Musical
PRODUCT book Evri/Product/Entertainment/Book
PRODUCT newspaper Evri/Product/Publication
PERSON politician Evri/Person/Politics/Politician
PERSON cabinet_member Evri/Person/Politics/Cabinet_Member
PERSON government_person Evri/Person/Politics/Government_Person
PERSON political_party_leader Evri/Person/Politics/Political_Party_Leader
PERSON judge Evri/Person/Politics/Judge
PERSON country_leader Evri/Person/Politics/Politician/World_Leader
PERSON joint_chiefs_of_staff TABLE 2-continued

```
Evri/Person/Politics/Politician/Joint_Chiefs_of_Staff
PERSON white_house_staff Evri/Person/Politics/White_House_Staff
PERSON activist Evri/Person/Politics/Activist
PERSON lobbyist Evri/Person/Politics/Lobbyist
PERSON ambassador Evri/Person/Politics/Ambassador
PERSON analyst Evri/Person/Analyst
PERSON journalist Evri/Person/Journalist
PERSON blogger Evri/Person/Blogger
ORGANIZATION band Evri/Organization/Entertainment/Band
ORGANIZATION political_party Evri/Organization/Politics/Political_Party
ORGANIZATION advocacy_group Evri/Organization/Politics/Advocacy_Group
EVENT film_award_ceremony Evri/Event/Entertainment/Film_Award_Ceremony
EVENT music_award_ceremony Evri/Event/Entertainment/Music_Award_Ceremony
EVENT television_award_ceremony Evri/Event/Entertainment/Television_Award_Ceremony
EVENT court_case Evri/Event/Politics/Court_Case
ORGANIZATION television_network
Evri/Organization/Entertainment/Company/Television_Network
ORGANIZATION music_production_company
Evri/Organization/Entertainment/Company/Music_Production_Company
ORGANIZATION film_production_company
Evri/Organization/Entertainment/Company/Film_Production_Company
LOCATION congressional_district Evri/Location/Politics/Congressional_District
LOCATION military_base Evri/Location/Politics/Military_Base
ORGANIZATION congressional_committee Evri/Organization/Politics/Congressional_Committee
ORGANIZATION international_organization
Evri/Organization/Politics/International_Organization
ORGANIZATION government_agency Evri/Organization/Politics/Government_Agency
ORGANIZATION armed_force Evri/Organization/Politics/Armed_Force
ORGANIZATION terrorist_organization
Evri/Organization/Politics/Terrorist_Organization
ORGANIZATION us_court Evri/Organization/Politics/US_Court
ORGANIZATION cabinet_department Evri/Organization/Politics/Cabinet_Department
LOCATION continent Evri/Location/Continent
LOCATION geographic_region Evri/Location/Geographic_Region
LOCATION country Evri/Location/Country
LOCATION province Evri/Location/Province
LOCATION state Evri/Location/State
LOCATION city Evri/Location/City
LOCATION us_city Evri/Location/City
LOCATION neighborhood Evri/Location/Neighborhood
LOCATION building Evri/Location/Structure/Building
LOCATION island Evri/Location/Island
LOCATION mountain Evri/Location/Mountain
LOCATION body_of_water Evri/Location/Body_of_Water
ORGANIZATION media_companyEvri/Organization/Entertainment/Company/Media_Company
ORGANIZATION haute_couture_house
Evri/Organization/Entertainment/Company/Haute_Couture_House
ORGANIZATION publishing_company
Evri/Organization/Entertainment/Company/Publishing_Company
ORGANIZATION entertainment_company Evri/Organization/Entertainment/Company
CONCEPT fictional_character Evri/Concept/Entertainment/Fictional_Character
PERSON military_leader Evri/Person/Politics/Military_Leader
PERSON military_person Evri/Person/Politics/Military_Person
EVENT military_conflict Evri/Event/Politics/Military_Conflict
PERSON terrorist Evri/Person/Politics/Terrorist
PERSON criminal Evri/Person/Criminal
PERSON explorer Evri/Person/Explorer
PERSON inventor Evri/Person/Technology/Inventor
PERSON lawyer Evri/Person/Lawyer
PERSON artist Evri/Person/Artist
PERSON painter Evri/Person/Artist/Painter
PERSON revolutionary Evri/Person/Revolutionary
PERSON spiritual_leader Evri/Person/Spiritual_Leader
PERSON philosopher Evri/Person/Philosopher
PERSON anthropologist Evri/Person/Anthropologist
PERSON architect Evri/Person/Architect
PERSON historian Evri/Person/Historian
PERSON editor Evri/Person/Editor
PERSON astronaut Evri/Person/Astronaut
PERSON photographer Evri/Person/Photographer
PERSON scientist Evri/Person/Technology/Scientist
PERSON economist Evri/Person/Economist
PERSON technology_person Evri/Person/Technology/Technology_Person
PERSON business_person Evri/Person/Business/Business_Person
PERSON stock_trader Evri/Person/Business/Business_Person/Stock_Trader
PERSON first_lady Evri/Person/Politics/First_Lady
ORGANIZATION us_state_legislature
Evri/Organization/Politics/Legislative_Body/State_Legislature
ORGANIZATION legislative_body Evri/Organization/Politics/Legislative_Body
ORGANIZATION executive_body Evri/Organization/Politics/Executive_Body
```

TABLE 2-continued

```
PERSON team_owner Evri/Person/Sports/Team_Owner
PERSON sports_announcer Evri/Person/Sports/Sports_Announcer
PERSON sports_executive Evri/Person/Sports/Sports_Executive
PERSON olympic_medalist Evri/Person/Sports/Olympic_Medalist
PERSON athlete Evri/Person/Sports/Athlete
PERSON coach Evri/Person/Sports/Coach
PERSON sports_official Evri/Person/Sports/Sports_Official
PERSON motorcycle_driver Evri/Person/Sports/Athlete/Motorcycle_Rider
PERSON race_car_driver Evri/Person/Sports/Athlete/Race_car_Driver
ORGANIZATION auto_racing_team Evri/Organization/Sports/Auto_Racing_Team
PERSON baseball_player Evri/Person/Sports/Athlete/Baseball_Player
ORGANIZATION baseball_team Evri/Organization/Sports/Baseball_Team
PERSON basketball_player Evri/Person/Sports/Athlete/Basketball_Player
ORGANIZATION basketball_team Evri/Organization/Sports/Basketball_Team
PERSON football_player Evri/Person/Sports/Athlete/Football_Player
ORGANIZATION football_team Evri/Organization/Sports/Football_Team
PERSON hockey_player Evri/Person/Sports/Athlete/Hockey_Player
ORGANIZATION hockey_team Evri/Organization/Sports/Hockey_Team
PERSON soccer_player Evri/Person/Sports/Athlete/Soccer_Player
ORGANIZATION soccer_team Evri/Organization/Sports/Soccer_Team
ORGANIZATION sports_league Evri/Organization/Sports/Sports_League
PERSON cricketer Evri/Person/Sports/Athlete/Cricketer
ORGANIZATION cricket_team Evri/Organization/Sports/Cricket_Team
PERSON cyclist Evri/Person/Sports/Athlete/Cyclist
ORGANIZATION cycling_team Evri/Organization/Sports/Cycling_Team
PERSON volleyball_player Evri/Person/Sports/Athlete/Volleyball_Player
ORGANIZATION volleyball_team Evri/Organization/Sports/Volleyball_Team
PERSON rugby_player Evri/Person/Sports/Athlete/Rugby_Player
ORGANIZATION rugby_team Evri/Organization/Sports/Rugby_Team
PERSON boxer Evri/Person/Sports/Athlete/Boxer
PERSON diver Evri/Person/Sports/Athlete/Diver
PERSON golfer Evri/Person/Sports/Athlete/Golfer
PERSON gymnast Evri/Person/Sports/Athlete/Gymnast
PERSON figure_skater Evri/Person/Sports/Athlete/Figure_Skater
PERSON horse_racing_jockey Evri/Person/Sports/Athlete/Horse_Racing_Jockey
PERSON lacrosse_player Evri/Person/Sports/Athlete/Lacrosse_Player
ORGANIZATION lacrosse_team Evri/Organization/Sports/Lacrosse_Team
PERSON rower Evri/Person/Sports/Athlete/Rower
PERSON swimmer Evri/Person/Sports/Athlete/Swimmer
PERSON tennis_player Evri/Person/Sports/Athlete/Tennis_Player
PERSON track_and_field_athlete Evri/Person/Sports/Athlete/Track_and_Field_Athlete
PERSON wrestler Evri/Person/Sports/Athlete/Wrestler
PERSON triathlete Evri/Person/Sports/Athlete/Triathlete
EVENT sports_competition Evri/Event/Sports/Sports_Event/Sporting_Competition
EVENT sports_event Evri/Event/Sports/Sports_Event
EVENT olympic_sport Evri/Event/Sports/Olympic_Sports
EVENT election Evri/Event/Politics/Election
LOCATION sports_venue Evri/Location/Sports/Sports_Venue
ORGANIZATION sports_division Evri/Organization/Sports/Sports_Division
ORGANIZATION sports_event_promotion_company
Evri/Organization/Sports/Sports_Event_Promotion_Company
ORGANIZATION sports_organization Evri/Organization/Sports/Sports_Organization
ORGANIZATION company Evri/Organization/Business/Company
ORGANIZATION news_agency Evri/Organization/Business/Company/News_Agency
PRODUCT cell_phone Evri/Product/Technology/Cell_Phone
PRODUCT computer Evri/Product/Technology/Computer
PRODUCT software Evri/Product/Technology/Software
PRODUCT video_game Evri/Product/Technology/Software/Video_Game
PRODUCT video_game_console Evri/Product/Technology/Video_Game_Console
PRODUCT media_player Evri/Product/Technology/Media_player
ORGANIZATION website Evri/Organization/Technology/Website
ORGANIZATION technology_company Evri/Organization/Technology/Company
PRODUCT magazine Evri/Product/Publication
ORGANIZATION financial_services_company
Evri/Organization/Business/Company/Financial_Services_Company
ORGANIZATION radio_network Evri/Organization/Entertainment/Company/Radio_Network
ORGANIZATION futures_exchange Evri/Organization/Business/Futures_Exchange
ORGANIZATION stock_exchange Evri/Organization/Business/Stock_Exchange
ORGANIZATION government_sponsored_enterprise
Evri/Organization/Politics/Government_Sponsored_Enterprise
ORGANIZATION political_organization Evri/Organization/Politics/Political_organization
ORGANIZATION labor_union Evri/Organization/Politics/Labor_Union
ORGANIZATION nonprofit_corporation
Evri/Organization/Business/Company/Nonprofit_Corporation
ORGANIZATION nonprofit_organization Evri/Organization/Nonprofit_Organization
ORGANIZATION national_laboratory Evri/Organization/Politics/National_Laboratory
ORGANIZATION unified_combatant_commands
Evri/Organization/Politics/Unified_Combatant_Commands
ORGANIZATION research_institute Evri/Organization/Research_Institute
CONCEPT stock_market_index Evri/Concept/Business/Stock_Market_Index
```

TABLE 2-continued

```
PERSON business_executive Evri/Person/Business/Business_Person/Business_Executive
PERSON corporate_director Evri/Person/Business/Business_Person/Corporate_Director
PERSON banker Evri/Person/Business/Business_Person/Banker
PERSON publisher Evri/Person/Business/Business_Person/Publisher
PERSON us_politician Evri/Person/Politics/U.S._Politician
PERSON nobel_laureate Evri/Person/Nobel_Laureate
PERSON chemist Evri/Person/Chemist
PERSON physicist Evri/Person/Physicist
ORGANIZATION business_organization Evri/Organization/Business/Business_Organization
ORGANIZATION consumer_organization Evri/Organization/Business/Consumer_Organization
ORGANIZATION professional_association Evri/Organization/Business/Professional_Association
PERSON investor Evri/Person/Business/Business_Person/Investor
PERSON financier Evri/Person/Business/Business_Person/Financier
PERSON money_manager Evri/Person/Business/Business_Person/Money_Manager
ORGANIZATION aerospace_company
  Evri/Organization/Business/Company/Aerospace_Company
ORGANIZATION advertising_agency
  Evri/Organization/Business/Company/Advertising_Company
ORGANIZATION agriculture_company
  Evri/Organization/Business/Company/Agriculture_Company
ORGANIZATION airline Evri/Organization/Business/Company/Airline
ORGANIZATION architecture_firm Evri/Organization/Business/Company/Architecture_Firm
ORGANIZATION automotive_company
  Evri/Organization/Business/Company/Automotive_Company
ORGANIZATION chemical_company Evri/Organization/Business/Company/Chemical_Company
ORGANIZATION clothing_company Evri/Organization/Business/Company/Clothing_Company
ORGANIZATION consulting_company
  Evri/Organization/Business/Company/Consulting_Company
ORGANIZATION cosmetics_company
  Evri/Organization/Business/Company/Cosmetics_Company
ORGANIZATION defense_company Evri/Organization/Business/Company/Defense_Company
ORGANIZATION distribution_company
  Evri/Organization/Business/Company/Distribution_Company
ORGANIZATION gaming_company Evri/Organization/Business/Company/Gaming_Company
ORGANIZATION electronics_company
  Evri/Organization/Business/Company/Electronics_Company
ORGANIZATION energy_company Evri/Organization/Business/Company/Energy_Company
ORGANIZATION hospitality_company
  Evri/Organization/Business/Company/Hospitality_Company
ORGANIZATION insurance_company Evri/Organization/Business/Company/Insurance_Company
ORGANIZATION law_firm Evri/Organization/Business/Company/Law_Firm
ORGANIZATION manufacturing_company
  Evri/Organization/Business/Company/Manufacturing_Company
ORGANIZATION mining_company Evri/Organization/Business/Company/Mining_Company
ORGANIZATION pharmaceutical_company
  Evri/Organization/Business/Company/Pharmaceutical_Company
ORGANIZATION railway_company Evri/Organization/Business/Company/Railway
ORGANIZATION real_estate_company
  Evri/Organization/Business/Company/Real_Estate_Company
ORGANIZATION retailer Evri/Organization/Business/Company/Retailer
ORGANIZATION shipping_company Evri/Organization/Business/Company/Shipping_Company
ORGANIZATION software_company
  Evri/Organization/Technology/Company/Software_Company
ORGANIZATION steel_company Evri/Organization/Business/Company/Steel_Company
ORGANIZATION telecommunications_company
  Evri/Organization/Business/Company/Telecommunications_Company
ORGANIZATION utilities_company Evri/Organization/Business/Company/Utilities_Company
ORGANIZATION wholesaler Evri/Organization/Business/Company/Wholesaler
ORGANIZATION television_production_company
  Evri/Organization/Entertainment/Company/Television_Production_Company
ORGANIZATION food_company Evri/Organization/Business/Company/Food_Company
ORGANIZATION beverage_company
  Evri/Organization/Business/Company/Food_Company/Beverage_Company
ORGANIZATION restaurant Evri/Organization/Business/Company/Food_Company/Restaurant
ORGANIZATION winery
  Evri/Organization/Business/Company/Food_Company/Beverage_Company
EVENT film_festival Evri/Event/Entertainment/Film_Festival
ORGANIZATION film_festival Evri/Event/Entertainment/Film_Festival
PRODUCT anime Evri/Product/Entertainment/Anime
PRODUCT aircraft Evri/Product/Aircraft
PRODUCT military_aircraft Evri/Product/Aircraft/Military_Aircraft
PRODUCT vehicle Evri/Product/Vehicle
PRODUCT ballet Evri/Product/Entertainment/Ballet
PRODUCT opera Evri/Product/Entertainment/Opera
PRODUCT painting Evri/Product/Entertainment/Painting
PRODUCT song Evri/Product/Entertainment/Single
EVENT technology_conference Evri/Event/Technology/Technology_Conference
CONCEPT legislation Evri/Concept/Politics/Legislation
CONCEPT treaty Evri/Concept/Politics/Treaty
ORGANIZATION trade_association Evri/Organization/Business/Trade_Association
```

TABLE 2-continued

ORGANIZATION technology_organization
Evri/Organization/Technology/Technology_Organization
ORGANIZATION educational_institution Evri/Organization/Educational_Institution
LOCATION museum Evri/Location/Structure/Building/Museum
LOCATION religious_building Evri/Location/Structure/Building/Religious_Building
PERSON astronomer Evri/Person/Astronomer
PERSON mathematician Evri/Person/Mathematician
PERSON academic Evri/Person/Academic
PERSON dancer Evri/Person/Entertainment/Dancer
PRODUCT play Evri/Product/Entertainment/Play
LOCATION botanical_garden Evri/Location/Botanical_Garden
LOCATION hospital Evri/Location/Health/Hospital
PERSON psychiatrist Evri/Person/Health/Psychiatrist
PERSON physician Evri/Person/Health/Physician
PERSON nurse Evri/Person/Health/Nurse
ORGANIZATION journalism_organization Evri/Organization/Journalism_Organization
ORGANIZATION healthcare_company
Evri/Organization/Business/Company/Healthcare_Company
ORGANIZATION religious_organization Evri/Organization/Religious_Organization
PERSON biologist Evri/Person/Scientist/Biologist
PERSON biochemist Evri/Person/Scientist/Biochemist
PERSON botanist Evri/Person/Scientist/Botanist
PERSON poet Evri/Person/Entertainment/Author/Poet
PERSON curler Evri/Person/Sports/Athlete/Curler
PERSON biathlete Evri/Person/Sports/Athlete/Biathlete
PERSON alpine_skier Evri/Person/Sports/Athlete/Alpine_Skier
PERSON cross-country_skier Evri/Person/Sports/Athlete/Cross-country_Skier
PERSON freestyle_skier Evri/Person/Sports/Athlete/Freestyle_Skier
PERSON luger Evri/Person/Sports/Athlete/Luger
PERSON nordic_combined_skier Evri/Person/Sports/Athlete/Nordic_Combined_Skier
PERSON speed_skater Evri/Person/Sports/Athlete/Speed_Skater
PERSON skeleton_racer Evri/Person/Sports/Athlete/Skeleton_Racer
PERSON ski_jumper Evri/Person/Sports/Athlete/Ski_Jumper
PERSON snowboarder Evri/Person/Sports/Athlete/Snowboarder
PERSON bobsledder Evri/Person/Sports/Athlete/Bobsledder
PERSON bodybuilder Evri/Person/Sports/Athlete/Bodybuilder
PERSON equestrian Evri/Person/Sports/Athlete/Equestrian
PERSON fencer Evri/Person/Sports/Athlete/Fencer
PERSON hurler Evri/Person/Sports/Athlete/Hurler
PERSON martial_artist Evri/Person/Sports/Athlete/Martial_Artist
PERSON canoer Evri/Person/Sports/Athlete/Canoer
LOCATION music_venue Evri/Location/Entertainment/Music_Venue
LOCATION aquarium Evri/Location/Aquarium
LOCATION cemetery Evri/Location/Cemetery
LOCATION national_park Evri/Location/National_Park
LOCATION volcano Evri/Location/Volcano
LOCATION zoo Evri/Location/Zoo
LOCATION structure Evri/Location/Structure
LOCATION airport Evri/Location/Structure/Airport
LOCATION bridge Evri/Location/Structure/Bridge
LOCATION hotel Evri/Location/Structure/Hotel
LOCATION palace Evri/Location/Structure/Palace
LOCATION monument Evri/Location/Structure/Monument
LOCATION street Evri/Location/Street
LOCATION amusement_park Evri/Location/Amusement_Park
LOCATION unitary_authority Evri/Location/Unitary_Authority
PRODUCT drug_brand Evri/Product/Health/Drug_Brand
PRODUCT weapon Evri/Product/Weapon
PRODUCT missile_system Evri/Product/Weapon/Missile_System
PRODUCT firearm Evri/Product/Weapon/Firearm
PRODUCT artillery Evri/Product/Weapon/Artillery
PRODUCT anti-aircraft_weapon Evri/Product/Weapon/Anti-aircraft_Weapon
PRODUCT anti-tank_weapon Evri/Product/Weapon/Anti-tank_Weapon
PRODUCT biological_weapon Evri/Product/Weapon/Biological_Weapon
PRODUCT chemical_weapon Evri/Product/Weapon/Chemical_Weapon
CHEMICAL chemical_weapon Evri/Product/Weapon/Chemical_Weapon
SUBSTANCE chemical_weapon Evri/Product/Weapon/Chemical_Weapon
PRODUCT explosive Evri/Product/Weapon/Explosive
PRODUCT weapons_launcher Evri/Product/Weapon/Weapons_Launcher
PERSON chess_player Evri/Person/Chess_Player
PERSON sculptor Evri/Person/Artist/Sculptor
PRODUCT game Evri/Product/Game
ORGANIZATION theater_company
Evri/Organization/Entertainment/Company/Theater_Company
PERSON badminton_player Evri/Person/Sports/Athlete/Badminton_Player
PRODUCT naval_ship Evri/Product/Watercraft/Naval_Ship
PRODUCT battleship Evri/Product/Watercraft/Naval_Ship/Battleship
PRODUCT cruiser Evri/Product/Watercraft/Naval_Ship/Cruiser
PRODUCT aircraft_carrier Evri/Product/Watercraft/Naval_Ship/Aircraft_Carrier
PRODUCT destroyer Evri/Product/Watercraft/Naval_Ship/Destroyer TABLE 2-continued

```
PRODUCT frigate Evri/Product/Watercraft/Naval_Ship/Frigate
PRODUCT submarine Evri/Product/Watercraft/Naval_Ship/Submarine
PRODUCT cruise_ship Evri/Product/Watercraft/Cruise_Ship
PRODUCT yacht Evri/Product/Watercraft/Yacht
PRODUCT ocean_liner Evri/Product/Watercraft/Ocean_Liner
LOCATION county Evri/Location/County
PRODUCT symphony Evri/Product/Entertainment/Symphony
ORGANIZATION television_station
  Evri/Organization/Entertainment/Company/Television_Station
ORGANIZATION radio_station Evri/Organization/Entertainment/Company/Radio_Station
CONCEPT constitutional_amendment Evri/Concept/Politics/Constitutional_Amendment
PERSON australian_rules_footballer Evri/Person/Sports/Athlete/Australian_Rules_Footballer
ORGANIZATION australian_rules_football_team
  Evri/Organization/Sports/Australian_Rules_Football_Team
ORGANIZATION criminal_organization Evri/Organization/Criminal_Organization
PERSON poker_player Evri/Person/Poker_Player
PERSON bowler Evri/Person/Sports/Athlete/Bowler
PERSON yacht_racer Evri/Person/Sports/Athlete/Yacht_Racer
PERSON water_polo_player Evri/Person/Sports/Athlete/Water_Polo_Player
PERSON field_hockey_player Evri/Person/Sports/Athlete/Field_Hockey_Player
PERSON skateboarder Evri/Person/Sports/Athlete/Skateboarder
PERSON polo_player Evri/Person/Sports/Athlete/Polo_Player
PERSON gaelic_footballer Evri/Person/Sports/Athlete/Gaelic_Footballer
PRODUCT programming_language Evri/Product/Technology/Programming_Language
PERSON engineer Evri/Person/Technology/Engineer
EVENT cybercrime Evri/Event/Technology/Cybercrime
EVENT criminal_act Evri/Event/Criminal_Act
PERSON critic Evri/Person/Critic
PERSON pool_player Evri/Person/Pool_Player
PERSON snooker_player Evri/Person/Snooker_Player
PERSON competitive_eater Evri/Person/Competitive_Eater
PRODUCT data_storage_medium Evri/Product/Technology/Data_Storage_Medium
PRODUCT data_storage_device Evri/Product/Technology/Data_Storage_Device
PERSON mountain_climber Evri/Person/Mountain_Climber
PERSON aviator Evri/Person/Aviator
ORGANIZATION cooperative Evri/Organization/Cooperative
CONCEPT copyright_license Evri/Concept/Copyright_License
EVENT observance Evri/Event/Observance
PERSON outdoor_sportsperson Evri/Person/Sports/Outdoor_Sportsperson
PERSON rodeo_performer Evri/Person/Sports/Rodeo_Performer
PERSON sports_shooter Evri/Person/Sports/Athlete/Sports_Shooter
CONCEPT award Evri/Concept/Award
CONCEPT entertainment_series Evri/Concept/Entertainment/Entertainment_Series
PERSON chef Evri/Person/Chef
PERSON cartoonist Evri/Person/Entertainment/Cartoonist
PERSON comics_creator Evri/Person/Entertainment/Comics_Creator
PERSON nobility Evri/Person/Nobility
PERSON porn_star Evri/Person/Porn_Star
PERSON archaeologist Evri/Person/Scientist/Archaeologist
PERSON paleontologist Evri/Person/Scientist/Paleontologist
PERSON victim_of_crime Evri/Person/Victim_of_Crime
LOCATION region Evri/Location/Region
PERSON linguist Evri/Person/Linguist
PERSON librarian Evri/Person/Librarian
PERSON bridge_player Evri/Person/Bridge_Player
PERSON choreographer Evri/Person/Entertainment/Choreographer
PRODUCT camera Evri/Product/Technology/Camera
PRODUCT publication Evri/Product/Publication
PRODUCT comic Evri/Product/Entertainment/Comic
PRODUCT short_story Evri/Product/Entertainment/Short_Story
ORGANIZATION irregular_military_organization
  Evri/Organization/Irregular_Military_Organization
SUBSTANCE chemical_element Evri/Substance/Chemical_Element
SUBSTANCE alkaloid Evri/Substance/Organic_Compound/Alkaloid
SUBSTANCE glycoside Evri/Substance/Glycoside
SUBSTANCE amino_acid Evri/Substance/Amino_Acid
SUBSTANCE protein Evri/Substance/Protein
SUBSTANCE enzyme Evri/Substance/Enzyme
SUBSTANCE hormone Evri/Substance/Hormone
SUBSTANCE hydrocarbon Evri/Substance/Organic_Compound/Hydrocarbon
SUBSTANCE inorganic_compound Evri/Substance/Inorganic_Compound
SUBSTANCE lipid Evri/Substance/Organic_Compound/Lipid
SUBSTANCE steroid Evri/Substance/Organic_Compound/Lipid/Steroid
SUBSTANCE molecule Evri/Substance/Molecule
SUBSTANCE polymer Evri/Substance/Molecule/Polymer
SUBSTANCE terpene Evri/Substance/Organic_Compound/Terpene
SUBSTANCE toxin Evri/Substance/Toxin
SUBSTANCE antibiotic Evri/Substance/Health/Antibiotic
SUBSTANCE antioxidant Evri/Substance/Health/Antioxidant
SUBSTANCE anti-inflammatory Evri/Substance/Health/Anti-inflammatory
```

TABLE 2-continued

SUBSTANCE antiasthmatic_drug Evri/Substance/Health/Antiasthmatic_drug
SUBSTANCE anticonvulsant Evri/Substance/Health/Anticonvulsant
SUBSTANCE antihistamine Evri/Substance/Health/Antihistamine
SUBSTANCE antihypertensive Evri/Substance/Health/Antihypertensive
SUBSTANCE antiviral Evri/Substance/Health/Antiviral
SUBSTANCE painkiller Evri/Substance/Health/Painkiller
SUBSTANCE Painkiller Evri/Substance/Health/Painkiller
SUBSTANCE anesthetic Evri/Substance/Health/Anesthetic
SUBSTANCE antibody Evri/Substance/Antibody
SUBSTANCE chemotherapeutic_drug Evri/Substance/Health/Chemotherapeutic
SUBSTANCE anti-diabetic_drug Evri/Substance/Health/Anti-diabetic
SUBSTANCE antianginal_drug Evri/Substance/Health/Antianginal
SUBSTANCE muscle_relaxant Evri/Substance/Health/Muscle_relaxant
SUBSTANCE hypolipidemic_drug Evri/Substance/Health/Hypolipidemic_Drug
SUBSTANCE psychoactive_drug Evri/Substance/Health/Psychoactive_Drug
SUBSTANCE vaccine Evri/Substance/Health/Vaccine
SUBSTANCE gastrointestinal_drug Evri/Substance/Health/Gastrointestinal_Drug
SUBSTANCE erectile_dysfunction_drug Evri/Substance/Health/Erectile_Dysfunction_Drug
SUBSTANCE organometallic_compound
Evri/Substance/Organic_Compound/Organometallic_Compound
SUBSTANCE phenol Evri/Substance/Organic_Compound/Phenol
SUBSTANCE ketone Evri/Substance/Organic_Compound/Ketone
SUBSTANCE amide Evri/Substance/Organic_Compound/Amide
SUBSTANCE ester Evri/Substance/Organic_Compound/Ester
SUBSTANCE ether Evri/Substance/Organic_Compound/Ether
SUBSTANCE heterocyclic_compound
Evri/Substance/Organic_Compound/Heterocyclic_Compound
SUBSTANCE organic_compound Evri/Substance/Organic_Compound
SUBSTANCE carbohydrate Evri/Substance/Organic_Compound/Carbohydrate
SUBSTANCE peptide Evri/Substance/Organic_Compound/Peptide
SUBSTANCE organohalide Evri/Substance/Organic_Compound/Organohalide
SUBSTANCE organosulfur_compound
Evri/Substance/Organic_Compound/Organosulfur_Compound
SUBSTANCE aromatic_compound Evri/Substance/Organic_Compound/Aromatic_Compound
SUBSTANCE carboxylic_acid Evri/Substance/Organic_Compound/Carboxylic_Acid
SUBSTANCE nucleic_acid Evri/Substance/Nucleic_Acid
SUBSTANCE ion Evri/Substance/Ion
ORGANISM cyanobacterium Evri/Organism/Health/Cyanobacterium
ORGANISM gram-positive_bacterium Evri/Organism/Health/Gram-positive_Bacterium
ORGANISM gram-negative_bacterium Evri/Organism/Health/Gram-negative_Bacterium
ORGANISM acid-fast_bacterium Evri/Organism/Health/Acid-fast_Bacterium
ORGANISM dna_virus Evri/Organism/Health/DNA_Virus
ORGANISM rna_virus Evri/Organism/Health/RNA_Virus
CONDITION symptom Evri/Condition/Health/Symptom
CONDITION injury Evri/Condition/Health/Injury
CONDITION inflammation Evri/Condition/Health/Inflammation
CONDITION disease Evri/Condition/Health/Disease
CONDITION cancer Evri/Condition/Health/Disease/Cancer
ORGANISM medicinal_plant Evri/Organism/Health/Medicinal_Plant
ORGANISM poisonous_plant Evri/Organism/Poisonous_Plant
ORGANISM herb Evri/Organism/Herb
CONCEPT medical_procedure Evri/Concept/Health/Medical_Procedure
ORGANISM bacterium Evri/Organism/Health/Bacterium
ORGANISM virus Evri/Organism/Health/Virus
ORGANISM horse Evri/Organism/Horse
PERSON fugitive Evri/Person/Fugitive
ORGANIZATION military_unit Evri/Organization/Politics/Military_Unit
ORGANIZATION law_enforcement_agency
Evri/Organization/Politics/Law_Enforcement_Agency
LOCATION golf_course Evri/Location/Golf_Course
PERSON law_enforcement_agent Evri/Person/Politics/Law_Enforcement_Agent
PERSON magician Evri/Person/Entertainment/Magician
LOCATION educational_institution Evri/Organization/Educational_Institution
CONCEPT social_program Evri/Concept/Politics/Social_Program
EVENT international_conference Evri/Event/Politics/International_Conference All of the above U.S. patents, U.S. patent application publications, U.S. patent applications, foreign patents, foreign patent applications and non-patent publications referred to in this specification and/or listed in the Application Data Sheet, including but not limited to U.S. application Ser. No. 13/286,778, entitled "CATEGORY-BASED CONTENT RECOMMENDATION," filed Nov. 1, 2011, and U.S. Provisional Patent Application No. 61/408,965, entitled "CATEGORY-BASED CONTENT RECOMMENDATION," filed Nov. 1, 2010, are incorporated herein by reference, in their entireties.

From the foregoing it will be appreciated that, although specific embodiments have been described herein for purposes of illustration, various modifications may be made without deviating from the spirit and scope of this disclosure. For example, the methods, techniques, and systems for category-based content recommendation are applicable to other architectures. For example, instead of recommending textual content items, the techniques may be used to automatically recommend other types of items, such as music or other audio items, videos, applications (e.g., mobile applications), online activities, or the like. Also, the methods, techniques, and systems discussed herein are applicable to differing query languages, protocols, communication media (optical, wireless, cable, etc.) and devices (e.g., desktop computers, wireless handsets, electronic organizers, personal digital assistants, tablet computers, portable email machines, game machines, pagers, navigation devices such as GPS receivers, etc.).

The invention claimed is:

1. A computer-implemented method in a content recommendation system, the method comprising:
   processing a corpus of content items to determine, for each of the content items, multiple corresponding entities referenced by the content item, each of the determined entities being electronically represented by the content recommendation system;
   determining, for each of at least some of the content items, at least one corresponding category that is part of a taxonomy represented as a graph stored by the content recommendation system and that is associated with one of the multiple corresponding entities referenced by the content item, wherein determining the at least one corresponding category includes aggregating common nodes in taxonomic paths that are associated respectively with a first determined entity and a second determined entity that are part of the graph such that the corresponding category relates the first and second determined entities in an is-a relation, a part-of relation, or a member-of relation; and
   storing, for each of the content items, the determined multiple corresponding entities and the determined at least one corresponding category; and
   further comprising:
   receiving an indication of a category;
   selecting one or more of the content items that each have a corresponding category that matches the indicated category; and
   providing indications of the selected content items,
   wherein selecting the one or more content items includes ranking the one or more content items based on a credibility score determined for each content item.

2. A computer-implemented method in a content recommendation system, the method comprising:
   processing a corpus of content items to determine, for each of the content items, multiple corresponding entities referenced by the content item, each of the determined entities being electronically represented by the content recommendation system;
   determining, for each of at least some of the content items, at least one corresponding category that is part of a taxonomy represented as a graph stored by the content recommendation system and that is associated with one of the multiple corresponding entities referenced by the content item, wherein determining the at least one corresponding category includes aggregating common nodes in taxonomic paths that are associated respectively with a first determined entity and a second determined entity that are part of the graph such that the corresponding category relates the first and second determined entities in an is-a relation, a part-of relation, or a member-of relation; and
   storing, for each of the content items, the determined multiple corresponding entities and the determined at least one corresponding category; and
   further comprising:
   receiving an indication of a category;
   selecting one or more of the content items that each have a corresponding category that matches the indicated category; and
   providing indications of the selected content items,
   wherein selecting the one or more content items includes ranking the one or more content items based on recency of each content item, such that more recent content items are ranked higher than less recent content items.

3. A computer-implemented method in a content recommendation system, the method comprising:
   processing a corpus of content items to determine, for each of the content items, multiple corresponding entities referenced by the content item, each of the determined entities being electronically represented by the content recommendation system;
   determining, for each of at least some of the content items, at least one corresponding category that is part of a taxonomy represented as a graph stored by the content recommendation system and that is associated with one of the multiple corresponding entities referenced by the content item, wherein determining the at least one corresponding category includes aggregating common nodes in taxonomic paths that are associated respectively with a first determined entity and a second determined entity that are part of the graph such that the corresponding category relates the first and second determined entities in an is-a relation, a part-of relation, or a member-of relation; and
   storing, for each of the content items, the determined multiple corresponding entities and the determined at least one corresponding category; and
   further comprising:
   receiving an indication of a category;
   selecting one or more of the content items that each have a corresponding category that matches the indicated category; and
   providing indications of the selected content items,
   wherein selecting the one or more content items includes collapsing similar content items into groups of content items, wherein similarity between two content items is based on at least one of: distance between signatures of the two content items, amount of overlap between titles of the two content items, amount of overlap between summaries of the two content items, amount of overlap between URLs referencing the two content items, and publishers of the two content items.

4. A computer-implemented method in a content recommendation system, the method comprising:
   processing a corpus of content items to determine, for each of the content items, multiple corresponding entities referenced by the content item, each of the determined entities being electronically represented by the content recommendation system;
   determining, for each of at least some of the content items, at least one corresponding category that is part of a taxonomy represented as a graph stored by the content recommendation system and that is associated with one of the multiple corresponding entities referenced by the content item, wherein determining the at least one corresponding category includes aggregating common nodes in taxonomic paths that are associated respectively with a first determined entity and a second determined entity that are part of the graph such that the corresponding category relates the first and second determined entities in an is-a relation, a part-of relation, or a member-of relation; and storing, for each of the content items, the determined multiple corresponding entities and the determined at least one corresponding category; and determining popular entities for an indicated category, the popular entities having recently received an increased number of references by content items in the corpus and/or having more references by content items in the corpus than other entities; and transmitting indications of the determined popular entities.

* * * * *